United States Patent
Park et al.

(10) Patent No.: US 9,913,263 B2
(45) Date of Patent: Mar. 6, 2018

(54) ASSOCIATION REQUEST FOR NARROWBAND COMMUNICATIONS IN A TELECOMMUNICATION ENVIRONMENT

(71) Applicants: Minyoung Park, Portland, OR (US); Robert Stacey, Portland, OR (US); Shahrnaz Azizi, Cupertino, CA (US); Thomas Kenney, Portland, OR (US); Eldad Perahia, Portland, OR (US)

(72) Inventors: Minyoung Park, Portland, OR (US); Robert Stacey, Portland, OR (US); Shahrnaz Azizi, Cupertino, CA (US); Thomas Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 14/581,259

(22) Filed: Dec. 23, 2014

(65) Prior Publication Data

US 2016/0183243 A1   Jun. 23, 2016

(51) Int. Cl.
*H04W 72/04* (2009.01)
*H04L 27/04* (2006.01)
(Continued)

(52) U.S. Cl.
CPC ............ *H04W 72/042* (2013.01); *H04L 1/00* (2013.01); *H04L 5/0053* (2013.01);
(Continued)

(58) Field of Classification Search
CPC ......... H04W 72/0406; H04W 72/0413; H04W 72/0466; H04W 76/02; H04W 76/021;
(Continued)

(56) References Cited

U.S. PATENT DOCUMENTS

| 5,754,961 A * | 5/1998 | Serizawa ............... H04B 7/26 370/343 |
| 2008/0080433 A1* | 4/2008 | Cromer ............... H04W 72/06 370/338 |

(Continued)

OTHER PUBLICATIONS

Search Report and Written Opinion for International Application No. PCT/US2015/062099 dated Feb. 29, 2016 (14 pgs.).

(Continued)

*Primary Examiner* — Joshua Kading
(74) *Attorney, Agent, or Firm* — Eversheds Sutherland (US) LLP

(57) ABSTRACT

Embodiments of the disclosure relate to operational association between communication devices in the presence of a link-budget imbalance between an upstream link and a downstream link at one of the communication devices. The association relies on a request for a narrowband resource block sent from the communication device having the link-budget imbalance to a remote communication device that can schedule and/or allocate the narrowband resource block. The request can be modulated according to an on-off keying modulation scheme or can be encoded according to a multi-repetition encoding scheme. In response to the narrowband resource block being allocated, an association request can be sent to the remote communication device in the narrowband resource block.

23 Claims, 11 Drawing Sheets

(51) Int. Cl.
*H04W 52/02* (2009.01)
*H04W 72/14* (2009.01)
*H04L 1/00* (2006.01)
*H04W 84/12* (2009.01)
*H04L 5/00* (2006.01)
*H04L 27/12* (2006.01)

(52) U.S. Cl.
CPC ............ *H04L 5/0092* (2013.01); *H04L 27/04* (2013.01); *H04W 52/0241* (2013.01); *H04W 72/0413* (2013.01); *H04W 72/0453* (2013.01); *H04W 72/14* (2013.01); *H04L 5/0023* (2013.01); *H04L 5/0064* (2013.01); *H04L 27/12* (2013.01); *H04W 84/12* (2013.01)

(58) Field of Classification Search
CPC ... H04W 76/027; H04W 48/16; H04W 84/18; H04W 28/16; H04W 72/042; H04W 72/0453; H04W 72/14; H04W 52/0241; H04W 84/12; H04L 5/0016; H04L 5/0053; H04L 5/0091; H04L 5/0092; H04L 27/02; H04L 27/10; H04L 47/748; H04L 12/5695; H04L 5/0064; H04L 5/0023; H04L 1/00; H04L 27/04; H04L 27/12
See application file for complete search history.

(56) References Cited

U.S. PATENT DOCUMENTS

| 2009/0164638 | A1 | 6/2009 | Jang et al. |
| 2010/0026517 | A1* | 2/2010 | Cumeralto ............ G01D 4/006 340/870.03 |
| 2012/0236971 | A1* | 9/2012 | Taghavi Nasrabadi ............ H04L 5/0023 375/340 |
| 2013/0107912 | A1* | 5/2013 | Ponnampalam .... H04L 27/0008 375/147 |
| 2013/0322363 | A1 | 12/2013 | Chen et al. |
| 2014/0038657 | A1 | 2/2014 | Junho Jo et al. |
| 2016/0044642 | A1* | 2/2016 | Xu ........................ H04L 5/0096 370/329 |
| 2016/0249381 | A1* | 8/2016 | Choi ..................... H04W 74/06 |

OTHER PUBLICATIONS

Sony, 'MTC operation with a Narrowband PDCCH', R1-145018, 3GPP TSG RAN WG1 Meeting #79, Nov. 8, 2014 (15 pgs.).
Search Report for Taiwanese Patent Application No. TW104138088, completed Sep. 13, 2016, 6 pages (includes 1 pg. translation of Search Report).

* cited by examiner

ASSOCIATION REQUEST FOR NARROWBAND COMMUNICATIONS IN A TELECOMMUNICATION ENVIRONMENT

BACKGROUND

In certain conventional telecommunication systems an access point (or base station) can provide wireless transmissions to a station (STA) or other type of user equipment in the downstream link (or downlink) at a power that is higher than the transmit power utilized by the communication device to send a wireless transmission in the upstream link (or uplink) to the access point. Such asymmetry in the transmit power in the downlink and uplink can be enabled by scheduling and allocating a narrow resource block to the STA that is associated or otherwise attached to the AP. The narrow resource block has a spectral width that is smaller than the operating channel width of the STA.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
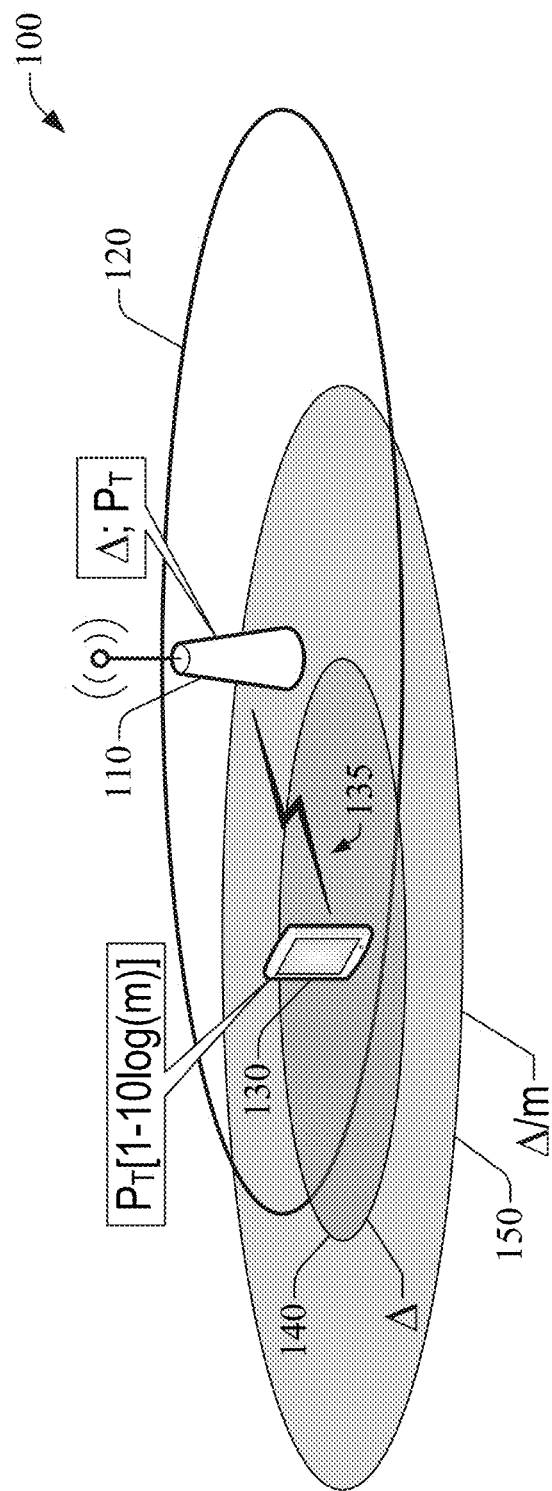
FIG. 1 illustrates examples of operational environments in accordance with one or more aspects of the disclosure.

The disclosure recognizes and addresses, in at least certain embodiments, the issue of association between communication devices in the presence of a link-budget imbalance between such devices. More specifically, yet not exclusively, the disclosure provides devices, systems, techniques, and/or computer program products that can permit association between a station or other type of user equipment and an AP in the presence of a link-budget imbalance between the uplink and the downlink of the station, for example. At least certain embodiments of the disclosure can be applied to any unscheduled uplink packet transmissions initiated by a station when such a link-budget imbalance is present. In certain embodiments, such transmissions can include, for example, (1) a trigger packet transmission from the STA for unscheduled automatic power save delivery (U-APSD) and/or power save (PS) poll (PS-Poll); (2) a Probe Request frame transmission for active scanning; or the like. In the present disclosure, a station or user equipment can refer to a communication device, which is an electronic device having computational resources, including processing resources (e.g., processor(s)), memory resources (memory devices also referred to as memory), software and/or firmware, and communication resources for exchange of information within the computing device and/or with other communication devices. Such resources can have different levels of architectural complexity depending on specific device functionality. The exchange of information among communication device in accordance with aspects of the disclosure can be performed wirelessly and/or non-wirelessly as described herein. Other components (e.g., sensors, cameras, etc.) can be present in the station or user equipment in order to provide functionality besides telecommunication (wireless or otherwise). More specifically, in one example, a communication device in accordance with this disclosure can be embodied in a tethered computing device or a portable computing device, such as a mobile tablet computer, an electronic-book reader (also referred to as an e-reader), a mobile telephone (e.g., a smartphone), and the like. In another example, the communication device can be embodied in or can comprise a wearable computing device, such as a watch, goggles or head-mounted visors, or the like. In yet another example, the communication device can be embodied in or can comprise portable consumer electronics equipment, such as a camera, a media reproduction device, a portable television set, a gaming console, a navigation device, a voice-over-internet-protocol (VoIP) telephone or two-way communication device, and the like. In additional or alternative embodiments, a combination of a communication device (e.g., a VoIP telephone) and a second device (e.g., a television set) can utilize the interactive digital menus of this disclosure, where the communication device and the second device can be synchronized so as to display or otherwise present a digital menu options at the second device (which may be referred to as a second screen). While various aspects or features of the disclosure are illustrated herein with reference to Wi-Fi protocols, such as IEEE 802.11a, IEEE 802.11e, IEEE 802.11n, IEEE 802.11 ac, IEEE 802.11 ax, or the like, it should be appreciated that the disclosure is not so limited and other radio technology protocols can be contemplated.

As described in greater detail below, the computing devices, systems, platforms, methods, and computer program products disclosed herein can address a link-budget imbalance between the uplink (UL) and the downlink (DL) and can close the UL by leveraging or otherwise utilizing robust modulation and/or encoding. More specifically, in the pre-association stage, a station or other type of user equipment can rely on on-off keying (OOK), amplitude shift keying (ASK), frequency shift keying (FSK), or a repetition coding scheme at a lower rate than the rate utilized in a post-association stage. As such, the STA can send a request, to an AP, to be scheduled for a narrow bandwidth (e.g., δ) transmission in a UL channel having a bandwidth Δ. Here, δ and Δ are real numbers and, in one aspect, δ<<Δ. In certain embodiments, δ=2.5 MHz and Δ=20 MHz. In response to receiving the request for the resource allocation, the AP can schedule the STA station for an uplink transmission with the narrow bandwidth δ (e.g., 2.5 MHz) in the Δ (e.g., 20 MHz) channel bandwidth. As such, the AP can send resource allocation information to the STA conveying the allocated narrow bandwidth resource block. In response to receiving the allocation information, the STA can send an association request frame suitable for the narrow bandwidth δ at a scheduled time, for example, using the allocated narrowband resource block in the Δ channel bandwidth.

It should be appreciated that such a narrow frequency allocation, as achieved via at least certain embodiments of the disclosure, can be useful for services or other type of applications, such as the Internet-of-things (IOT), that may need to support many stations with low data traffic. In addition, at least certain embodiments of the disclosure can permit reducing power consumption at a station or other type of user equipment and, thus, lowering manufacturing costs of the station or the other type of user equipment. Power consumption can be reduced by configuring the station or the other type of user equipment to transmit at lower power in a suitable narrowband resource block.

With reference to the drawings, FIG. 1 presents a block diagram of an example operational environment 100 in which communication devices can leverage or otherwise utilize narrowband association requests in accordance with at least certain aspects of the disclosure. The operational environment 100 includes an access point 110 that can exchange wireless signals with other communication devices within a confined region 120. To that end, the access point 110 (also referred to as AP 110) can transmit wireless information at a transmit power $P_T$, and can operate in a channel having spectral width Δ (also generally referred to as bandwidth Δ). In certain embodiments, Δ can be any one of 20 MHz, 40 MHz, 80 MHz, or 160 MHz. The spatial coverage (herein generally referred to as "footprint") of the confined region 120 can be determined by the transmit power $P_T$ of the access point—e.g., the surface of the confined region 120 increases with $P_T$. The confined region 120 can be embodied in or can include an indoor region (e.g., a commercial facility, such as a shopping mall) and/or a spatially confined outdoor region (such as an open or semi-open parking lot or garage). The access point 110, which can be embodied in, for example, a low-power base station, can operate in accordance with a specific radio technology protocol (e.g., 3G, LTE, or LTE Advanced, Wi-Fi, or the like). It should be appreciated that other functional elements (e.g., servers, routers, gateways, and the like) also can be included in the operational environment 100. In certain embodiments, the AP 110 can operate in accordance with the IEEE 802.11 ax standard (also referred to as high-efficiency (HE) WLAN or HEW). In such embodiments, the operational environment 100, including any communication devices operationally attached to (or associated with) the AP 110 may be referred to as a basic service set (BSS).

In certain scenarios, the AP 110 can communicate with multiple communication devices. To that end, in certain embodiments, the AP 110 can implement communication techniques for multiple access, such as orthogonal frequency division multiple access (OFDMA). For example, in IEEE 802.11ax, OFDMA can increase network efficiency by packing data packets more efficiently than in other techniques for multiple access. In OFDMA, the available transmit and/or receive bandwidth is divided into several portions (generally referred to as subcarriers), and a group of the several portions can be assigned to a specific communication device. In certain embodiments, the AP 110 can operate with a bandwidth Δ (such as 20 MHz, 40 MHz, 80 MHz, or 160 MHz) in which the AP 110 can transmit wireless signal to a communication device and/or receive wireless signal therefrom. The wireless signal can be transmitted and/or received according to OFDMA. As such, the AP 110 can divide the bandwidth into a specific number of subcarriers and can allocate a portion of the subcarriers for communication with the communication device. The portion of subcarriers can be referred to as a "resource block allocation" and the number of subcarriers present in the allocated portion can be referred to as an "allocation size."

As an illustration, within a Δ=20 MHz channel bandwidth, the AP 110 can allocate multiple smaller frequency channel allocations for different communication device (e.g., stations or other type of user equipment). The minimum resource allocation size can be, for example, as small as 2.5 MHz for a single communication device. In such a scenario, at most eight STAs can access the physical medium (e.g., the air interface) simultaneously or nearly simultaneously in a 20 MHz channel for uplink data transmissions to their associated AP. In addition, since each of the STAs can utilize a channel bandwidth that is about eight times narrower than the 20 MHz downlink channel, an STA's uplink can have about 9 dB higher link budget than the downlink when the STA utilizes the same transmit power as in transmission in the 2.5 MHz channel. In other words, the station can use 9 dB lower transmit power for low power consumption and low cost while having the same link budget in both uplink and downlink.

The AP 110 can select or otherwise determine an allocation of a resource block based at least on available allocation sizes and factors such as signal-to-noise ratio (SNR), received signal strength (as quantified by a received signal strength indicator (RSSI), for example), or other type of metrics representative of communication conditions. An allocation size can be selected from a group of available allocation sizes in accordance with this disclosure. The AP 110 can schedule the allocation of the resource block for the communication device to transmit and/or receive a wireless communication.

In addition, in order to communicate with another communication device (e.g., a station, user equipment, or the like), the other communication device can be operationally associated with the AP 110. To that end, in one aspect, the AP 110 can transmit pilot signal (e.g., a beacon) that can convey the presence of the AP 110 and/or other information that can characterize the AP 110. The communication device can receive the pilot signal in the downlink (DL) and, in response, can send an association request to the AP 110. The AP 110 can receive the association request and the association between the AP 110 and the communication device can proceed. It can be appreciated that, in scenarios in which the association request does not reach the AP 110, the association between the communication device and the AP can be precluded. In addition, in certain embodiments, the communication device operating in a pre-association state (e.g., prior to being associated with the AP 110) can send wireless transmissions (e.g., pilot signals, such as association requests) using a UL transmit power that is lower than $P_T$.

Accordingly, for example, the pilot signals transmitted in the UL by the communication device may not reach the AP 110.

More specifically, the operational environment 100 illustrates a communication device 130 that can send wireless transmissions in the UL using a transmit power $P_T(1-10 \log(m))$ when the communication device 130 operates in a channel having spectral width $\Delta$. Here m can be a natural number that represents the reduction of the transmit power at the communication device 130 with respect to $P_T$. In certain embodiments, m=8 and, therefore, at an operating bandwidth of $\Delta$, the transmit power at the communication device can be about 9 dB lower than the transmit power $P_T$ of the AP 110. As such, the footprint of wireless transmissions of the communication device 130 can be represented by a confined region 140 having a smaller coverage than the confined region 120. Therefore, in one aspect, in a scenario in which the communication device 130 is located near the edge of the confined region 120, UL wireless transmissions (e.g., UL packets) provided by the communication device 130 may not reach the AP 110. Accordingly, in such a scenario, the AP 110 may not receive an association request sent in the UL by the communication device 130 in response to pilot signals (e.g., beacons). The communication device 130 can exchange wireless signals with the AP 110 via wireless links 135 configured in accordance with a specific radio technology protocol (e.g., femtocell protocols, picocell protocols, Wi-Fi protocols, such as IEEE 802.11ac, IEEE 802.11ax, etc.; or the like). The wireless links 135 can include a UL and a DL that form the air interface between the communication device 130 and the AP 110. It should be appreciated that while the communication device 130 is depicted as a specific type of device (e.g., a tablet computer), the disclosure is not limited in that respect and the communication device 130 can be embodied in or can include any other type of communication devices.

In other scenarios, the communication device 130 can operate in a sub-channel of the channel having spectral width $\Delta$. In particular, yet not exclusively, the communication device 130 can operate in a sub-channel having a spectral width $\Delta/m$, therefore increasing the UL budget for wireless transmissions. The sub-channel can have a bandwidth less than $\Delta$ and, thus, can be referred to as narrowband channel. In embodiments in which m=8, the increase in the UL budget can be about 9 dB. Accordingly, operating in such a channel, the footprint of UL wireless transmissions of the communication device 130 can increase, providing coverage that includes the AP 110. As illustrated, the coverage of the communication device 130, while in operation in the sub-channel having spectral width $\Delta/m$, can span the region 150. As such, even in scenarios in which the communication device 130 is located at the edge of the confined region 120, UL wireless transmission can reach the AP 110. Accordingly, with the increased UL budget, the communication device 130 can respond to pilot signal(s) (e.g., a beacon) received from the AP 110 at a transmit power that can be sufficient for a response from the communication device 130 to reach the AP 110.

The communication device 130 can operate in a narrowband sub-channel upon or after the AP 110 has scheduled the communication device 130 to operate in such a sub-channel and has allocated a resource block corresponding to the narrowband sub-channel. For example, in embodiments in which the communication device 130 can operate in OFDMA, the resource block can correspond to multiple sub-carriers (e.g., 56 sub-carriers) within the channel having spectral width $\Delta$. Accordingly, the communication device 130 may send UL wireless transmissions in the channel having spectral bandwidth $\Delta$ in a pre-association state.

The AP 110 and the communication device 130, as well as other communication devices (e.g., stations or other type of user equipment) contemplated in the present disclosure, can include electronic devices having computational resources, including processing resources (e.g., processor(s)), memory resources (memory devices (also referred to as memory)), software and/or firmware, and communication resources for exchange of information within the computing device and/or with other computing devices. Such resources can have different levels of architectural complexity depending on specific device functionality. In certain implementations, the exchange of information among computing devices in accordance with aspects of the disclosure can be performed wirelessly as described herein, and thus, in one aspect, the AP 110 and the communication device 130, as well as any other computing device of this disclosure, can be generally referred to as wireless computing devices or wireless devices. Example of computing devices contemplated in the present disclosure include desktop computers with wireless communication resources; mobile computers, such as tablet computers, smartphones, notebook computers, laptop computers with wireless communication resources, Ultrabook™ computers; gaming consoles, mobile telephones; blade computers; programmable logic controllers; near field communication devices; customer premises equipment with wireless communication resources, such as set-top boxes, wireless routers, wireless-enabled television sets, or the like; and so forth. The wireless communication resources can include radio units (also referred to as radios) having circuitry for processing of wireless signals, processor(s), memory device(s), and the like, where the radio, the processor(s), and the memory device(s) can be coupled via a bus architecture.

Figure 2:
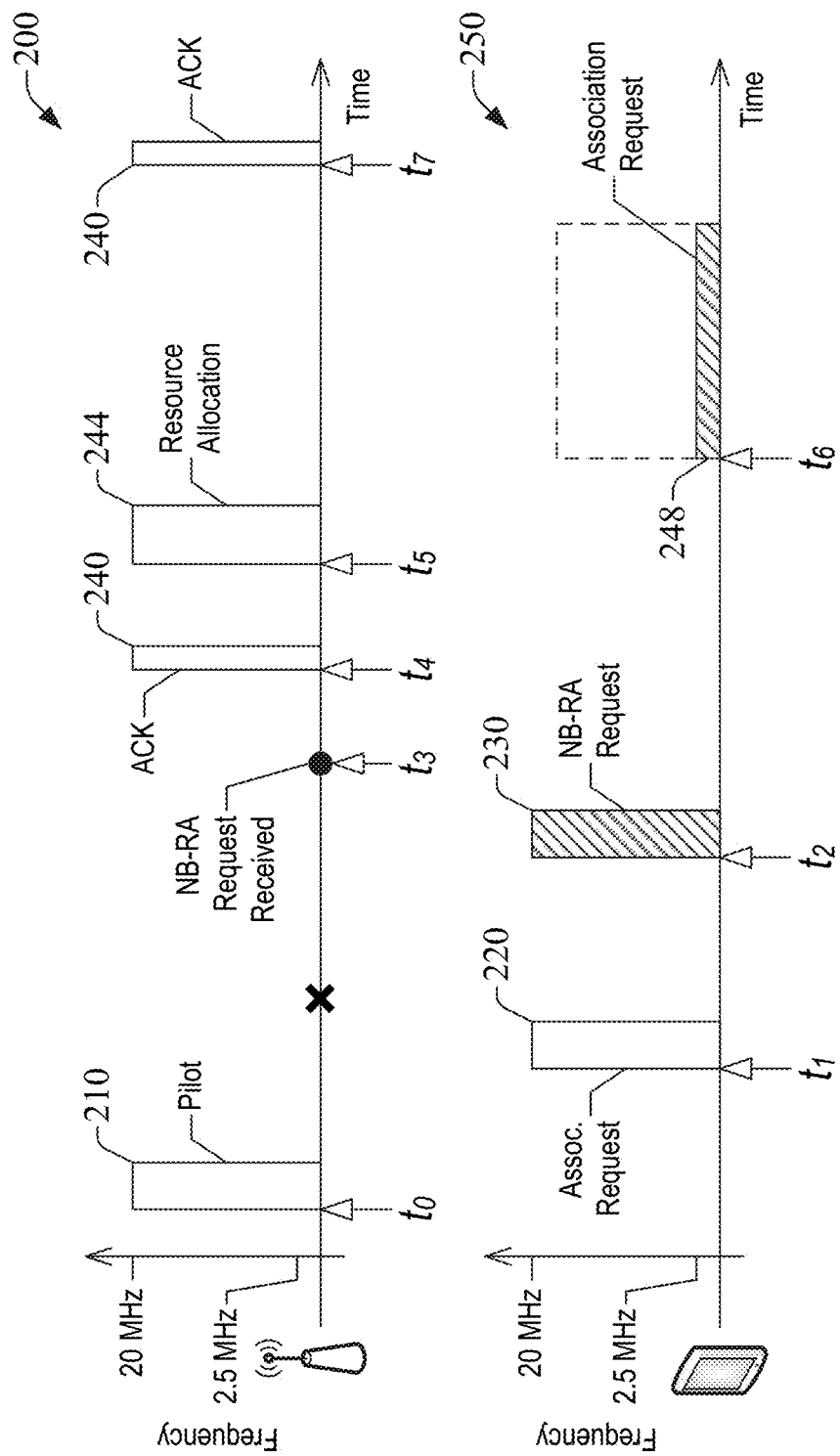
FIG. 2 illustrates an example of a communication flow between communication devices in accordance with one or more embodiments of this disclosure.

In certain embodiments, the imbalance between the UL and DL budgets of a STA (e.g., communication device 130) that operates in $\Delta$ channel (e.g., a 20 MHz channel) can be addressed as illustrated in FIG. 2, for example. Therefore, in one aspect, the STA can associate with an access point (e.g., AP 110) operating in the $\Delta$ channel. In FIG. 2, panels 200 and 250 illustrate, respectively, the example operation of the AP and the STA. At time $t_0$, the AP can send (e.g., broadcast) a pilot signal 210 (such as a beacon frame in IEEE 802.11ax). The STA can scan its environment for the AP to associate with, and can receive the pilot signal 210. At $t_1 > t_0$, in response to the pilot signal 210, the STA can send an association request frame 220 to the AP. In an embodiment in which the STA operates according to IEEE 802.11ax, the STA can utilize or leverage a physical layer convergence protocol (PLCP) and related PLCP protocol data units (PPDUs) in order to transmit the association request frame 220 in the $\Delta$ channel. In a scenario in which the association request frame 220 is not received at the AP (refer to the cross in panel 200), the AP may not send an acknowledgment (ACK) frame to the STA. If the STA does not receive the ACK frame from the AP, the STA can send, at time $t_2$, for example, a request frame 230 requesting a narrowband (or narrow bandwidth) resource allocation (NB-RA). Such a request frame may be referred to as NB-RA request frame and, in one aspect, can be transmitted or otherwise provided by the STA in a robust modulation and coding scheme (MCS). In one example, the robust MCS can be embodied in or can include on-off keying (OOK) at 250 kbps. In another example, the robust MCS can be embodied in N-times repetition coding. In an implementation in which the STA transmits information wirelessly according to IEEE 802.11 ax, N=m (e.g., N=8) with an information rate of 812.5 kbps=6.5 Mbps/8, where 6.5 Mbps is the lowest information rate in IEEE 802.11 ax. In certain embodiments, the NB-RA request frame can include a STA identification (STA-ID) or an ID code for other type of user equipment. In an implementation in which the AP and the STA operate according to Wi-Fi protocols (e.g., IEEE 802.11ac, IEEE 802.11ax, or the like), the STA can generate the STA-ID by hashing a media access control (MAC) address of the STA with the basic service set identification (BSSID) of the AP. In one embodiment, a hashing operation to generate the STA-ID can include an XOR operation between the MAC address of the STA and the BSSID, where the XOR operation is a bitwise exclusive OR operation. In the alternative or in other implementations, the STA-ID can be embodied in or can include a temporary association ID (AID) that the STA can select or otherwise determine randomly from a group of AIDs dedicated for association of the STA with an access point. Example embodiments of the NB-RA request frame are disclosed hereinafter with reference to FIGS. 3-5.

After the transmission of the NB-RA request frame 230, the STA can wait for the requested resource allocation from the AP. As illustrated, the AP can receive the NB-RA request frame 230 and, in response, the AP can send an ACK frame 240 at $t_4$. The AP can determine a STA-ID of the STA using the NB-RA request frame 230. More specifically, for example, the AP can decode the NB-RA request frame 230 and can identify a sequence of bits conveying the STA-ID. In addition, in one implementation, the AP can schedule the STA in the Δ channel by allocating a narrowband resource block in the UL. The AP can allocate such a resource block to the STA identified by the STA-ID. The narrowband resource block can be embodied in, for example, a resource block having a group of OFDMA sub-carriers that span a narrow frequency bandwidth δ less than Δ. In one example, Δ=20 MHz and δ=Δ/m=20 MHz/8=2.5 MHz. The AP can transmit resource allocation information 244 indicative or otherwise representative of the allocated narrowband resource block.

The STA can receive the resource allocation information 244 (e.g., a resource allocation frame) and can decode or otherwise determine (e.g., decode) a STA identification (or other type of user equipment ID) and/or a specific resource allocation, e.g., the resource block spanning the narrow frequency bandwidth δ. As illustrated in FIG. 2, δ=Δ/m. In line with the foregoing example, Δ=20 MHz and δ=δ/m=20 MHz/8=2.5 MHz. In such an example, m=8 and, thus, the STA can gain 9 dB in link budget by sending information within the allocated resource block. At $t_6$, the STA can send an association request frame 248 in the allocated resource block. In view of the increased link budget, the association request frame 240 can reach the AP (without a robust MCS or otherwise). In response to receiving the association request frame 240, the AP can transmit, at $t_7$, an ACK frame 240 to the STA, and can initiate the association process between the AP and the STA.

Figure 3:
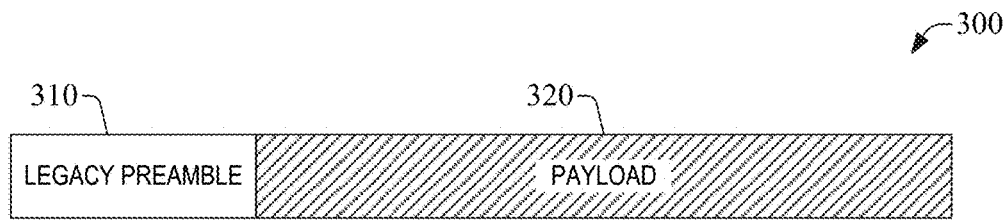
FIG. 3 presents an example of a radio packet for telecommunication in accordance with one or more embodiments of the disclosure.

FIG. 3 illustrates an example of an NB-RA request frame 300 in accordance with one or more embodiments of the disclosure. As illustrated, the NB-RA request frame 300 can include a legacy preamble 310 that can be decoded and/or otherwise processed by a STA operating according to a contemporaneous radio protocol (e.g., IEEE 802.ax) utilized by an AP to which the STA attempts to associate with, or to a legacy radio protocol (e.g., IEEE 802.11a, IEEE 802.e, or IEEE 802.n). As such, the legacy preamble 310 is included for third-party legacy STAs to provide information such as the length of the packet for coexistence. In one example, the legacy preamble 310 can be formatted according to IEEE 802.11 protocols. The legacy preamble 310 also can be processed (e.g., decoded) by non-legacy communication devices. The NB-RA request frame 300 also can include a payload portion 320 (referred to as payload 320) that can include one or more fields, each having a specific number of symbols The payload 320 can include various formatting information. In certain embodiments, payload 320 can span a time interval (herein referred to as "length") as long as about 87 μs=($2^{16}$ octets)×(8 bits/6 Mbps), where 6 Mbps can be lowest information rate of a protocol utilized for wireless transmissions. As such, for an information rate f, the length of the payload 320 can be $\tau=(2^{16}$ octets$)\times(8$ bits$)\times f^1$. In one example, the length of the payload field can be about 5 μs. The number of bits in the payload 330 can be determined by the modulation scheme (e.g., BPSK) utilized to transmit the NB-RA request frame 300.

The information in the legacy preamble 310, and the number of fields and specific content of each field (both of which may be referred to as "field structure") in the payload 320 can be modulated or otherwise formatted in numerous ways. In certain embodiments, as described herein, the STA can modulate the NB-RA request frame 300 according to on-off keying (OOK). In other embodiments, as described herein, the STA can encode the NB-RA request frame 300 according to eight-times (8×) repetition coding or, more generally, any other p-times repetition coding, with p a natural number greater than unity.

Figure 4:
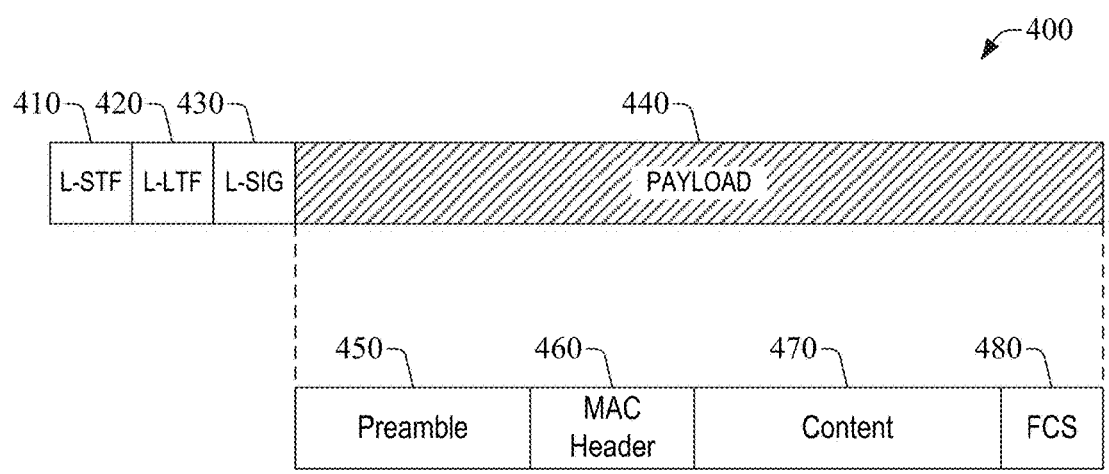
FIG. 4 presents another example of a radio packet for telecommunication in accordance with one or more embodiments of the disclosure.

More specifically, in certain embodiments, such as in the example frame 400 illustrated in FIG. 4, the legacy preamble 310 can include three legacy fields: legacy short training field (L-STF) 410, legacy long training field (L-LTF) 420, and legacy signal (L-SIG) field 430. Each of such fields can include one or more symbols. The L-STF 410 can include two symbols, the L-LTF 420 can include two symbols, and the L-SIG field 430 can include one symbol. In addition, the payload 440 can embody the payload 320 and can include a preamble 450, a MAC header field 460 (or MAC header 460), a content field 470, and a validation field 480, which is illustrated as a frame check sequence (FCS) field 480. As described herein, in certain embodiments, the payload 440 can span a time interval as long as about 87 μs. In one embodiment, the length of the payload field can be about 5 μs. The number of bits in the payload 440 can be determined by the modulation scheme utilized to transmit the NB-RA request frame 400. In certain embodiments, the preamble 450 can include 16 bits.

In one aspect, the MAC header 460 can convey that the frame 400 is an NB-RA frame and the content field 470 can include identification (e.g., a STA-ID or other type of ID code) of the STA that generates and/or sends the frame 400. As illustrated, the validation field 480 can be embodied in a FCS field 480 computed or otherwise determined as a checksum of the MAC header 460 and the content field 470. As described herein, in certain implementations, the checksum can be determined via a bitwise XOR operation between the MAC header 460 and at least a portion of the content field 470. In certain embodiments, the MAC header 460 can include 16 bits and the content field 470 can include 96 bits. It should be appreciated that the disclosure is limited with respect to the number of bits in the preamble 450, the MAC header 460, and/or the content field 470, and such fields can include other number of bits besides those exemplified herein.

The example frame 400 can be modulated according to OOK. For example, each OFDM symbol (which can span about 4 microseconds) may indicate one bit information resulting in a (4 μs)$^{-1}$=250 kbps physical (PHY) layer rate. It should be appreciated that, in one aspect, non-coherent OOK can have a bit error rate (BER) that is 4 dB higher than that of binary phase shift keying (BPSK), which can have a BER of about 10$^{-4}$. Yet, since the data rate is about 24 times lower than the lowest MCS (e.g., data rate of 6 Mbps) in a 20 MHz packet, the OOK at 250 kbps can achieve 10 dB (e.g., nearly 13.8 dB−4 dB) better link budget than BPSK at 6 Mbps. As such, OOK modulation as described herein can close the link from the STA to an AP operating in a Δ channel. The foregoing analysis applies to embodiments in which a 20 MHz receiver at the AP is assumed to be a simple receiver design. In other embodiments, the design approach of the AP receiver can be to have two receive branches where one branch processes the signal as if it is a 20 MHz signal and the other branch processes the received signal after any legacy preambles with a narrow band receiver. In a scenario in which 2.5 MHz transmissions from the STA are present (via, for example, 7 or 8 subcarriers OOK), another 9 dB better link budget can be achieved. Therefore, in certain embodiments, the NB-RA frame can be sent from the STA at a total of about 19 dB better link budget using OOK at 250 kbps data rate, for example.

In certain embodiments, a simple OOK demodulator can be implemented at the AP in parallel with an orthogonal frequency-division multiplexing (OFDM) demodulator to receive an OOK modulated packet.

Figure 5:
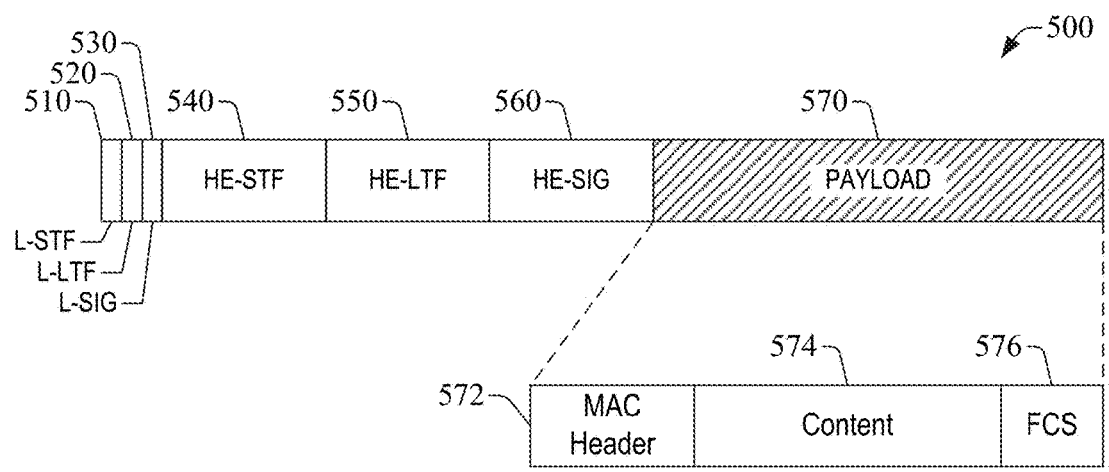
FIG. 5 presents yet another example of radio packet for telecommunication in accordance with one or more embodiments of the disclosure.

FIG. 5 illustrates another example of a NB-RA request frame in accordance with one or more embodiments of the disclosure. A station can encode the frame 500 according to eight-times (8×) repetition coding in order to close the uplink between the station and an AP. The example frame 500 can include a legacy preamble formed by a L-STF 510, a L-LTF 520, and a L-SIG field 530. In one example, each of such fields can include two symbols. In addition, following the legacy preamble, three fields according to the IEEE 802.11ax protocol (or high efficiency wireless local area network (HEW) can be included in the example frame 500: a high-efficiency (HE) short training field (HE-STF) 540, a HE long training field (HE-LTF) 550, and a HE signal (HE-SIG) field 560. In 8× coding, the station can include 16 symbols in each of HE-STF 540, HE-LTF 550, and HE-SIG field 560. In addition, the example frame 500 can include payload 570 encoded according to 8× repetition encoding. In certain embodiments, the payload 570 can span a time interval as long as about 87 μs. In one example, the length of the payload 570 can be about 5 μs. The number of bits in the payload 570 can be determined by the modulation scheme utilized to transmit the NB-RA request frame 500. As illustrated, the payload 570 can include a MAC header 572, a content field 574, and a validation field 576. Similar to the payload 570, the MAC header 572 can convey that the example frame is NB-RA frame, and the content field 574 can convey identification (e.g., a STA-ID code or other type of code) of the STA that generates and/or sends the example frame 500. The validation field 576 can include a FCS or other type of validation information, such as a CRC, computed or otherwise determined as a frame check sequence of the MAC header 572 and the content 574. As described herein, the legacy fields 510, 520, and 530 can provide information for coexistence to third party legacy 802.11 stations. The AP may not be able to receive the legacy 802.11 preamble correctly due to link-budget imbalance aspects described herein. As such, the AP can rely on or otherwise leverage the fields coded with eight-times (8×) repetition coding following the legacy preamble formed by the fields 510, 520, and 530.

Figure 6:
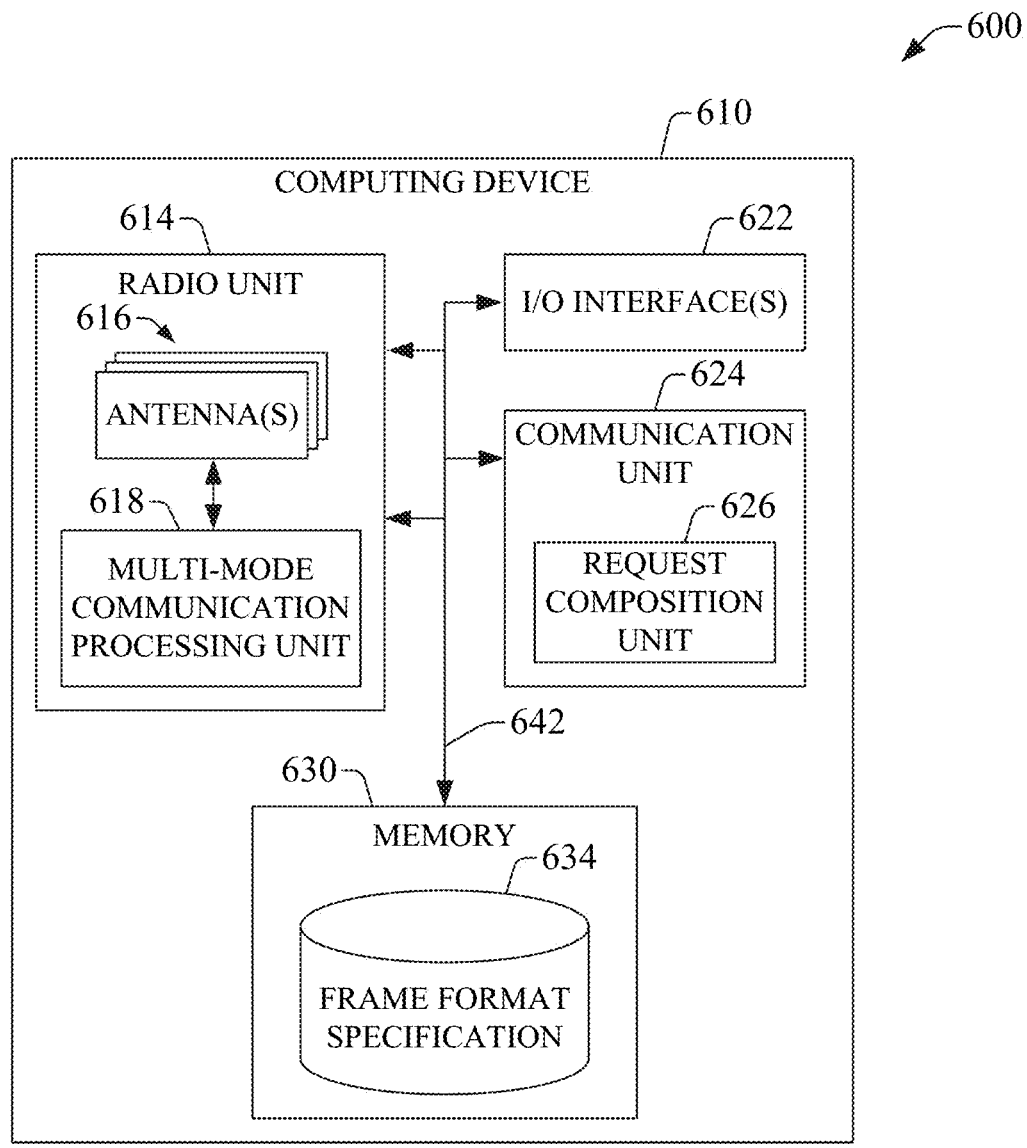
FIG. 6 presents an example of a communication device in accordance with one or more embodiments of the disclosure.

FIG. 6 illustrates a block-diagram of an example embodiment 600 of a computing device 610 that can operate in accordance with at least certain aspects of the disclosure. In one aspect, the computing device 610 can operate as a wireless device and can embody or can comprise an access point, a mobile computing device (e.g., a station or other type of user equipment), or other type of communication device that can transmit and/or receive wireless communications in accordance with this disclosure. To permit wireless communication, including the scheduling of resource block allocations as described herein, the computing device 610 includes a radio unit 614 and a communication unit 624. In certain implementations, the communication unit 624 can generate packets or other type of information blocks via a network stack, for example, and can convey the packets or other type of information block to the radio unit 614 for wireless communication. In one embodiment, the network stack (not shown) can be embodied in or can constitute a library or other type of programming module, and the communication unit 624 can execute the network stack in order to generate a packet or other type of information block. Generation of the packet or the information block can include, for example, generation of control information (e.g., checksum data, communication address(es)), traffic information (e.g., payload data), and/or formatting of such information into a specific packet header.

As illustrated, the radio unit 614 can include one or more antennas 616 and a multi-mode communication processing unit 618. In certain embodiments, the antenna(s) 616 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 616 can be physically separated to leverage spatial diversity and related different channel characteristics associated with such diversity. In addition or in other embodiments, the multi-mode communication processing unit 618 that can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3$^{rd}$ Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 618 also can process non-wireless signals (analogic, digital, a combination thereof, or the like). While illustrated as separate blocks in the computing device 610, it should be appreciated that in certain embodiments, at least a portion of the multi-mode communication processing unit 618 and the communication unit 624 can be integrated into a single unit (e.g., a single chipset or other type of solid state circuitry).

Figure 7:
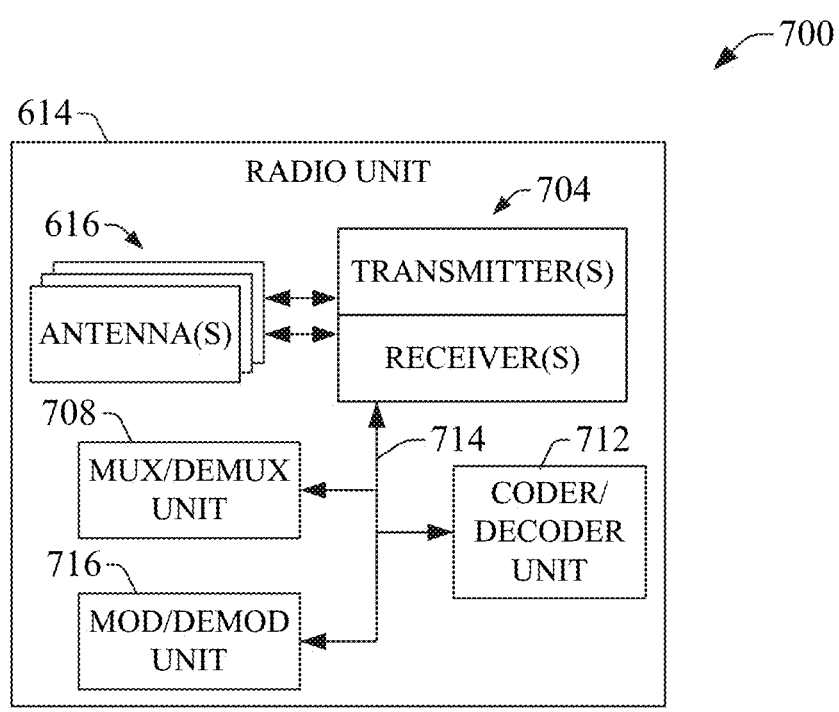
FIG. 7 presents an example of a radio unit in accordance with one or more embodiments of the disclosure.

In one embodiment, e.g., example embodiment 700 shown in FIG. 7, the multi-mode communication processing unit 618 can comprise a set of one or more transmitters/receivers 704, and components therein (amplifiers, filters, analog-to-digital (A/D) converters, etc.), functionally coupled to a multiplexer/demultiplexer (mux/demux) unit 708, a modulator/demodulator (mod/demod) unit 716 (also referred to as modem 716), and a coder/decoder unit 712 (also referred to as codec 712). Each of the transmitter(s)/receiver(s) can form respective transceiver(s) that can transmit and receive wireless signal (e.g., electromagnetic radiation) via the one or more antennas 616. It should be appreciated that in other embodiments, the multi-mode communication processing unit 618 can include other functional elements, such as one or more sensors, a sensor hub, an offload engine or unit, a combination thereof, or the like.

Electronic components and associated circuitry, such as mux/demux unit 708, codec 712, and modem 716 can permit or facilitate processing and manipulation, e.g., coding/decoding, deciphering, and/or modulation/demodulation, of signal(s) received by the computing device 610 and signal(s) to be transmitted by the computing device 610. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 704, can exchange information (e.g., data, metadata, code instructions, signaling and related payload data, combinations thereof, or the like) through a bus 714, which can embody or can comprise at least one of a system bus, an address bus, a data bus, a message bus, a reference link or interface, a combination thereof, or the like. Each of the one or more receivers/transmitters 704 can convert a signal from analog to digital and vice versa. In addition or in the alternative, the receiver(s)/transmitter(s) 704 can divide a single data stream into multiple parallel data streams, or perform the reciprocal operation. Such operations may be conducted as part of various multiplexing schemes. As illustrated, the mux/demux unit 708 is functionally coupled to the one or more receivers/transmitters 704 and can permit processing of signals in time and frequency domain. In one aspect, the mux/demux unit 708 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 708 can scramble and spread information (e.g., codes) according to most any code, such as Hadamard-Walsh codes, Baker codes, Kasami codes, polyphase codes, and the like. The modem 716 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; frequency shift keying (FSK); amplitude-shift keying (ASK)), phase-shift keying (PSK), and the like). In addition, processor(s) that can be included in the computing device 610 (e.g., processor(s) included in the radio unit 614 or other functional element(s) of the computing device 610) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 712 can operate on information (e.g., data, metadata, signaling, or a combination thereof) in accordance with one or more coding/decoding schemes suitable for communication, at least in part, through the one or more transceivers formed from respective transmitter(s)/receiver(s) 704. In one aspect, such coding/decoding schemes, or related procedure(s), can be retained as a group of one or more computer-accessible instructions (computer-readable instructions, computer-executable instructions, or a combination thereof) in one or more memory devices 630 (herein referred to as memory 630). In a scenario in which wireless communication among the computing device 610 and another computing device (e.g., a station or other type of user equipment) utilizes MIMO, MISO, SIMO, or SISO operation, the codec 712 can implement at least one of space-time block coding (STBC) and associated decoding, or space-frequency block (SFBC) coding and associated decoding. In addition or in the alternative, the codec 712 can extract information from data streams coded in accordance with spatial multiplexing scheme. In one aspect, to decode received information (e.g., data, metadata, signaling, or a combination thereof), the codec 712 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 712 can utilize, at least in part, mux/demux unit 708 and mod/demod unit 716 to operate in accordance with aspects described herein.

With further reference to FIG. 6, the computing device 610 can operate in a variety of wireless environments having wireless signals conveyed in different electromagnetic radiation (EM) frequency bands. To at least such end, the multi-mode communication processing unit 618 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 610 can receive and/or transmit information encoded and/or modulated or otherwise processed in accordance with aspects of the present disclosure. To at least such an end, in certain embodiments, the computing device 610 can acquire or otherwise access information, wirelessly via the radio unit 614 (also referred to as radio 614), where at least a portion of such information can be encoded and/or modulated in accordance with aspects described herein. More specifically, for example, the information can include association requests, NB-RA requests, resource allocations, ACK frames, and/or other type of packets (e.g., PPDUs) in accordance with embodiments of the disclosure. For example, an NB-RA request can be formatted as shown in FIGS. 3-5. As illustrated, the computing device 610 can include one or more memory elements 634 (referred to frame format specification 634) that can include information defining or otherwise specifying one or more formats for composition or otherwise generation of a NB-RA request frame. The communication unit 624 can access at least a portion of the information in the frame format specification 634 and can generate a NB-RA request having a format in accordance with one of those described in FIGS. 3-5. To that end, the communication unit 624 can include a request composition unit 626 that can generate the NR-RA request. As described herein, the NR-RA request can be included in or can embody a PPDU.

The memory 630 can contain one or more memory elements having information suitable for processing information received according to a predetermined communication protocol (e.g., IEEE 802.11ac, IEEE 802.11ax, or the like). While not shown, in certain embodiments, one or more memory elements of the memory 630 can include computer-accessible instructions that can be executed by one or more of the functional elements of the computing device 610 in order to implement at least some of the functionality for association between communication devices (e.g., a STA and an AP) in accordance with aspects described herein, including processing of information communicated (e.g., encoded, modulated, and/or arranged) in accordance with an aspect of the disclosure. One or more groups of such computer-accessible instructions can embody or can constitute a programming interface that can permit communication of information (e.g., data, metadata, and/or signaling) between functional elements of the computing device 610 for implementation of such functionality.

As illustrated, the communication device 610 can include one or more I/O interfaces 622. At least one of the I/O interface(s) 622 can permit the exchange of information between the computing device 610 and another computing device and/or a storage device. Such an exchange can be wireless (e.g., via near field communication or optically-switched communication) or wireline. At least another one of the I/O interface(s) 622 can permit presenting information visually and/or aurally to an end-user of the computing device 610. In addition, two or more of the functional elements of the computing device 610 can exchange information (e.g., data, metadata, code instructions, signaling and related payload data, combinations thereof, or the like) through a bus 642, which can embody or can comprise at least one of a system bus, an address bus, a data bus, a message bus, a reference link or interface, a combination thereof, or the like. The bus 642 can include, for example, components for wireline and wireless communication.

It should be appreciated that portions of the computing device 610 can embody or can constitute an apparatus. For instance, the multi-mode communication processing unit 618, the communication unit 624, and at least a portion of the memory 630 can embody or can constitute an apparatus that can operate in accordance with one or more aspects of this disclosure.

Figure 8:
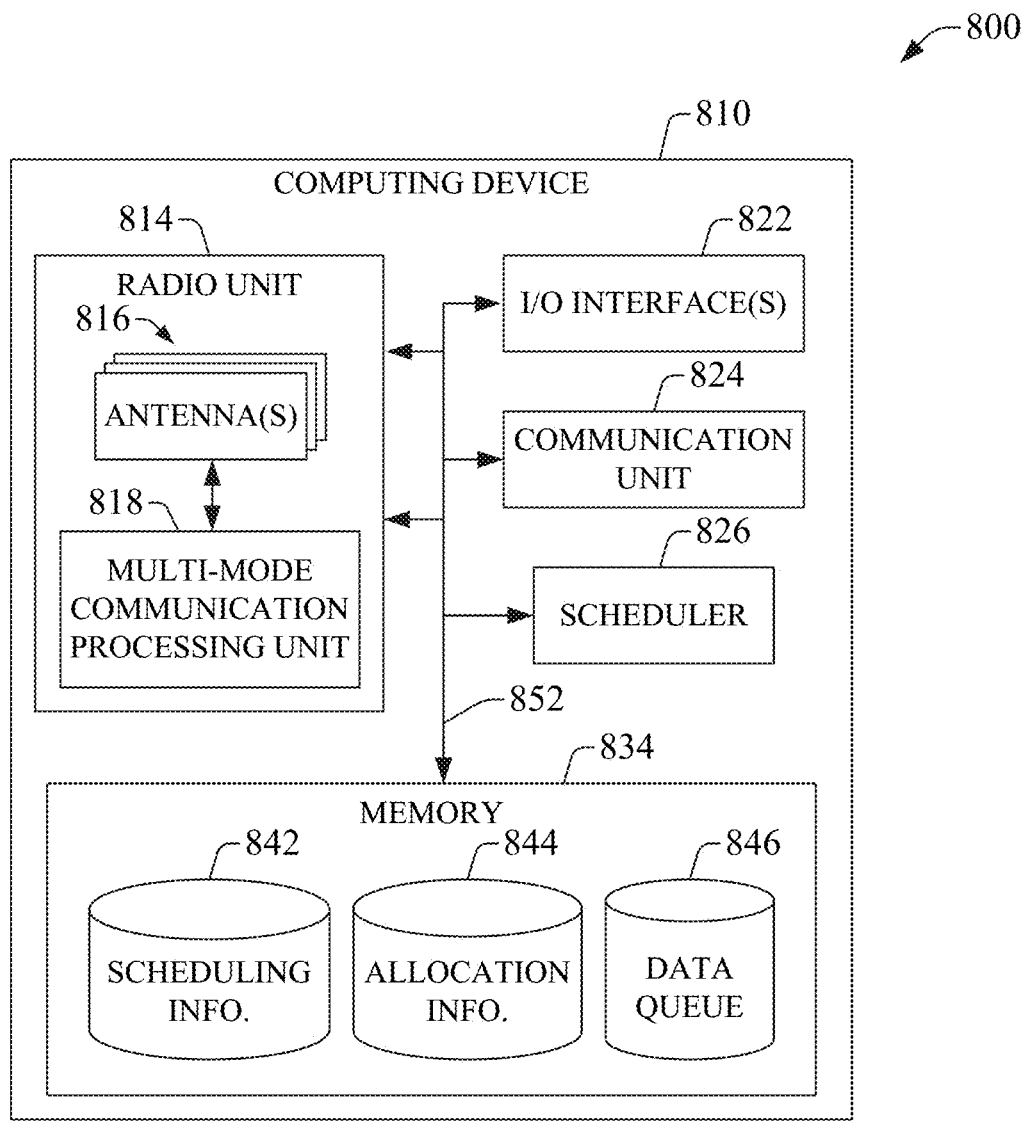
FIG. 8 presents another example of a communication device in accordance with one or more embodiments of the disclosure.

FIG. 8 illustrates a block-diagram of an example embodiment 800 of a computing device 810 that can operate in accordance with at least certain aspects of the disclosure. In one aspect, the computing device 810 can operate as a wireless device and can embody or can comprise an access point, such as AP 110 in accordance with this disclosure. To permit wireless communication, including the scheduling of resource block allocations as described herein, the computing device 810 includes a radio unit 814 and a communication unit 824. In certain implementations, the communication unit 824 can generate packets or other type of information blocks via a network stack, for example, and can convey the packets or other type of information block to the radio unit 814 for wireless communication. In one embodiment, the network stack (not shown) can be embodied in or can constitute a library or other type of programming module, and the communication unit 824 can execute the network stack in order to generate a packet or other type of information block. Generation of the packet or the information block can include, for example, generation of control information (e.g., checksum data, communication address (es)), traffic information (e.g., payload data), and/or formatting of such information into a specific packet header.

As illustrated, the radio unit 814 can include one or more antennas 816 and a multi-mode communication processing unit 818. In certain embodiments, the antenna(s) 816 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 816 can be physically separated to leverage spatial diversity and related different channel characteristics associated with such diversity. In addition or in other embodiments, the multi-mode communication processing unit 818 can process at least wireless signals in accordance with one or more radio technology protocols and/or modes (such as MIMO, single-input-multiple-output (SIMO), multiple-input-single-output (MISO), and the like). Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the IEEE 802.11 family of standards; WiMAX; radio technologies and related protocols for ad hoc networks, such as Bluetooth or ZigBee; other protocols for packetized wireless communication; or the like). The multi-mode communication processing unit 818 also can process non-wireless signals (analogic, digital, a combination thereof, or the like). While illustrated as separate blocks in the computing device 810, it should be appreciated that in certain embodiments, at least a portion of the multi-mode communication processing unit 818 and the communication unit 824 can be integrated into a single unit (e.g., a single chipset or other type of solid state circuitry).

Figure 9:
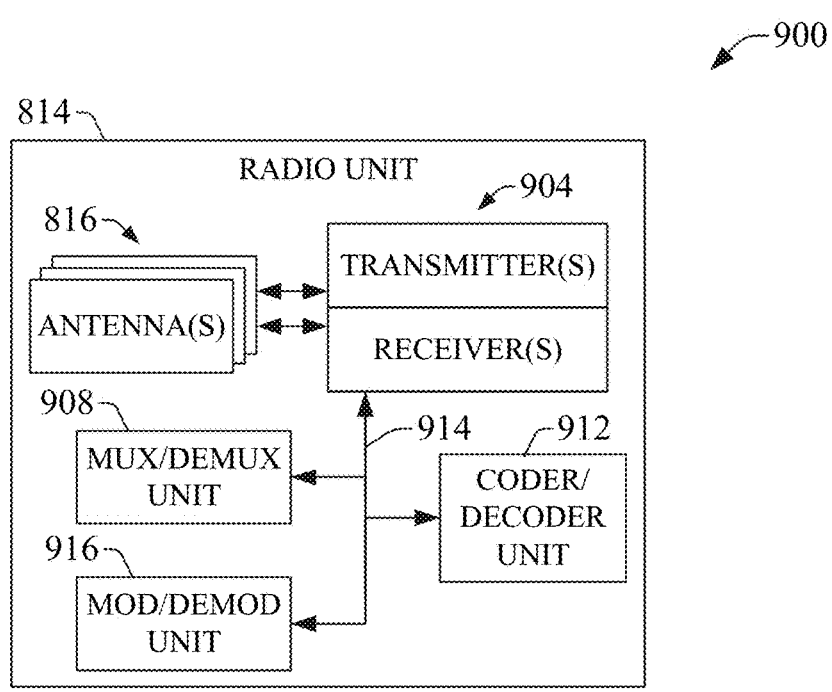
FIG. 9 presents another example of a radio unit in accordance with one or more embodiments of the disclosure.

In one embodiment, e.g., example embodiment 900 shown in FIG. 9, the multi-mode communication processing unit 818 can comprise a set of one or more transmitters/receivers 904, and components therein (amplifiers, filters, analog-to-digital (A/D) converters, etc.), functionally coupled to a multiplexer/demultiplexer (mux/demux) unit 908, a modulator/demodulator (mod/demod) unit 916 (also referred to as modem 916), and a coder/decoder unit 912 (also referred to as codec 912). Each of the transmitter(s)/receiver(s) can form respective transceiver(s) that can transmit and receive wireless signal (e.g., electromagnetic radiation) via the one or more antennas 816. It should be appreciated that in other embodiments, the multi-mode communication processing unit 818 can include other functional elements, such as one or more sensors, a sensor hub, an offload engine or unit, a combination thereof, or the like.

Electronic components and associated circuitry, such as mux/demux unit 908, codec 912, and modem 916 can permit or facilitate processing and manipulation, e.g., coding/decoding, deciphering, and/or modulation/demodulation, of signal(s) received by the computing device 810 and signal(s) to be transmitted by the computing device 810. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like; WiMAX; radio technologies and related protocols for ad hoc networks, such as Bluetooth or ZigBee; other protocols for packetized wireless communication; or the like.

The electronic components in the described communication unit, including the one or more transmitters/receivers 904, can exchange information (e.g., data, metadata, code instructions, signaling and related payload data, combinations thereof, or the like) through a bus 914, which can embody or can comprise at least one of a system bus, an address bus, a data bus, a message bus, a reference link or interface, a combination thereof, or the like. Each of the one or more receivers/transmitters 904 can convert signal from analog to digital and vice versa. In addition or in the alternative, the receiver(s)/transmitter(s) 904 can divide a single data stream into multiple parallel data streams, or perform the reciprocal operation. Such operations may be conducted as part of various multiplexing schemes. As illustrated, the mux/demux unit 908 is functionally coupled to the one or more receivers/transmitters 904 and can permit processing of signals in time and frequency domain. In one aspect, the mux/demux unit 908 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 908 can scramble and spread information (e.g., codes) according to most any code, such as Hadamard-Walsh codes, Baker codes, Kasami codes, polyphase codes, and the like. The modem 916 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK), phase-shift keying (PSK), and the like). In addition, processor(s) that can be included in the computing device 810 (e.g., processor(s) included in the radio unit 814 or other functional element(s) of the computing device 810) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 912 can operate on information (e.g., data, metadata, signaling, or a combination thereof) in accordance with one or more coding/decoding schemes suitable for communication, at least in part, through the one or more transceivers formed from respective transmitter(s)/receiver(s) 904. In one aspect, such coding/decoding schemes, or related procedure(s), can be retained as a group of one or more computer-accessible instructions (computer-readable instructions, computer-executable instructions, or a combination thereof) in one or more memory devices 834 (referred to as memory 834). In a scenario in which wireless communication among the computing device 810 and another computing device (e.g., a station or other type of user equipment) utilizes MIMO, MISO, SIMO, or SISO operation, the codec 912 can implement at least one of space-time block coding (STBC) and associated decoding, or space-frequency block (SFBC) coding and associated decoding. In addition or in the alternative, the codec 912 can extract information from data streams coded in accordance with spatial multiplexing scheme. In one aspect, to decode received information (e.g., data, metadata, signaling, or a combination thereof), the codec 912 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 912 can utilize, at least in part, mux/demux unit 908 and mod/demod unit 916 to operate in accordance with aspects described herein.

The computing device 810 can operate in a variety of wireless environments having wireless signals conveyed in different electromagnetic radiation (EM) frequency bands. To at least such end, the multi-mode communication processing unit 818 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 810 can receive and/or transmit information encoded and/or modulated or otherwise processed in accordance with aspects of the present disclosure. To at least such an end, in certain embodiments, the computing device 810 can acquire or otherwise access information, wirelessly via the radio unit 814 (also referred to as radio 814). For example, the computing device 810 can receive a NB-RA request from another communication device (e.g., communication device 130). In the illustrated embodiment, the computing device 810 includes a scheduler unit 826 (also referred to as scheduler 826) that can access scheduling information and can schedule or otherwise allocate a resource block the communication device. As described herein, the allocated resource block can be a narrow frequency bandwidth allocation (e.g., 2.5 MHz). In certain implementations, the scheduling information can include intended quality-of-service (QoS), such as intended data rate; signal strength; interference level; estimated distance between the communication device and the communication device 810; amount of traffic (or data) available or otherwise queued for the communication device being scheduled; and/or other type of scheduling factors. In addition or in other embodiments, the scheduling information can include information indicative or otherwise representative of modulation and coding schemes (MCSs) that may be assigned to a communication device that is being scheduled. The scheduling information can be retained in one or more memory devices 834 (referred to as memory 834) within one or more memory elements 842 (referred to as scheduling info. 842, which can be embodied in or can include registers, files, databases, and the like). Information indicative or otherwise representative of the traffic available to a communication device to be scheduled by the communication device 810 also can be retained in the memory 846 within one or more memory elements 846 (referred to as data queue 846).

The communication device 810 can select or otherwise determine a specific resource block for another communication device. As described herein, the resource block can have a size corresponding to a combination of predetermined allocation sizes, e.g., 56 tones, 106 tones, 236 tones, 500 tones, and 1008 tones. The predetermined allocation sizes can be retained in the memory 834 within one or more memory elements 844 (referred to as allocation info. 844). In addition or in other embodiments, the allocation info. 844 can include a specification of a frame format in which a NB-RA request can be received at the computing device 810. For instance, the allocation info. 844 can include information indicative or otherwise representative of the frame formats illustrated and described in connection with FIGS. 3-5. Upon or after the communication device 810 determines a resource block to be allocated (e.g., a narrowband resource block), the communication device 810 can transmit resource allocation information that can indicate the resource block (e.g., 236 tones) allocated to the communication device and the MCS that the communication device is to utilize for wireless transmissions. For communication of traffic and/or signaling, the AP 110, via the communication unit 824, for example, can form a wireless transmission for the communication device using the determined resource block and related allocation sizes.

In addition to scheduling info. 842, allocation info. 844, and data queue 846, the memory 834 can contain one or more memory elements having information suitable for processing information received according to a predetermined communication protocol (e.g., IEEE 802.11ac or IEEE 802.11ax). While not shown, in certain embodiments, one or more memory elements of the memory 834 can include computer-accessible instructions that can be executed by one or more of the functional elements of the computing device 810 in order to implement at least some of the functionality for association between communication devices (e.g., a STA and an AP) in accordance with aspects described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 810 for implementation of such functionality.

As illustrated, the communication device 810 can include one or more I/O interfaces 822. At least one of the I/O interface(s) 822 can permit the exchange of information between the computing device 810 and another computing device and/or a storage device. Such an exchange can be wireless (e.g., via near field communication or optically-switched communication) or wireline. At least another one of the I/O interface(s) 822 can permit presenting information visually and/or aurally to an end-user of the computing device 810. In addition, two or more of the functional elements of the computing device 810 can exchange information (e.g., data, metadata, code instructions, signaling and related payload data, combinations thereof, or the like) through a bus 852, which can embody or can comprise at least one of a system bus, an address bus, a data bus, a message bus, a reference link or interface, a combination thereof, or the like. The bus 852 can include, for example, components for wireline and wireless communication.

It should be appreciated that portions of the computing device 810 can embody or can constitute an apparatus. For instance, the multi-mode communication processing unit 818, the communication unit 824, and at least a portion of the memory 834 can embody or can constitute an apparatus that can operate in accordance with one or more aspects of this disclosure.

Figure 10:
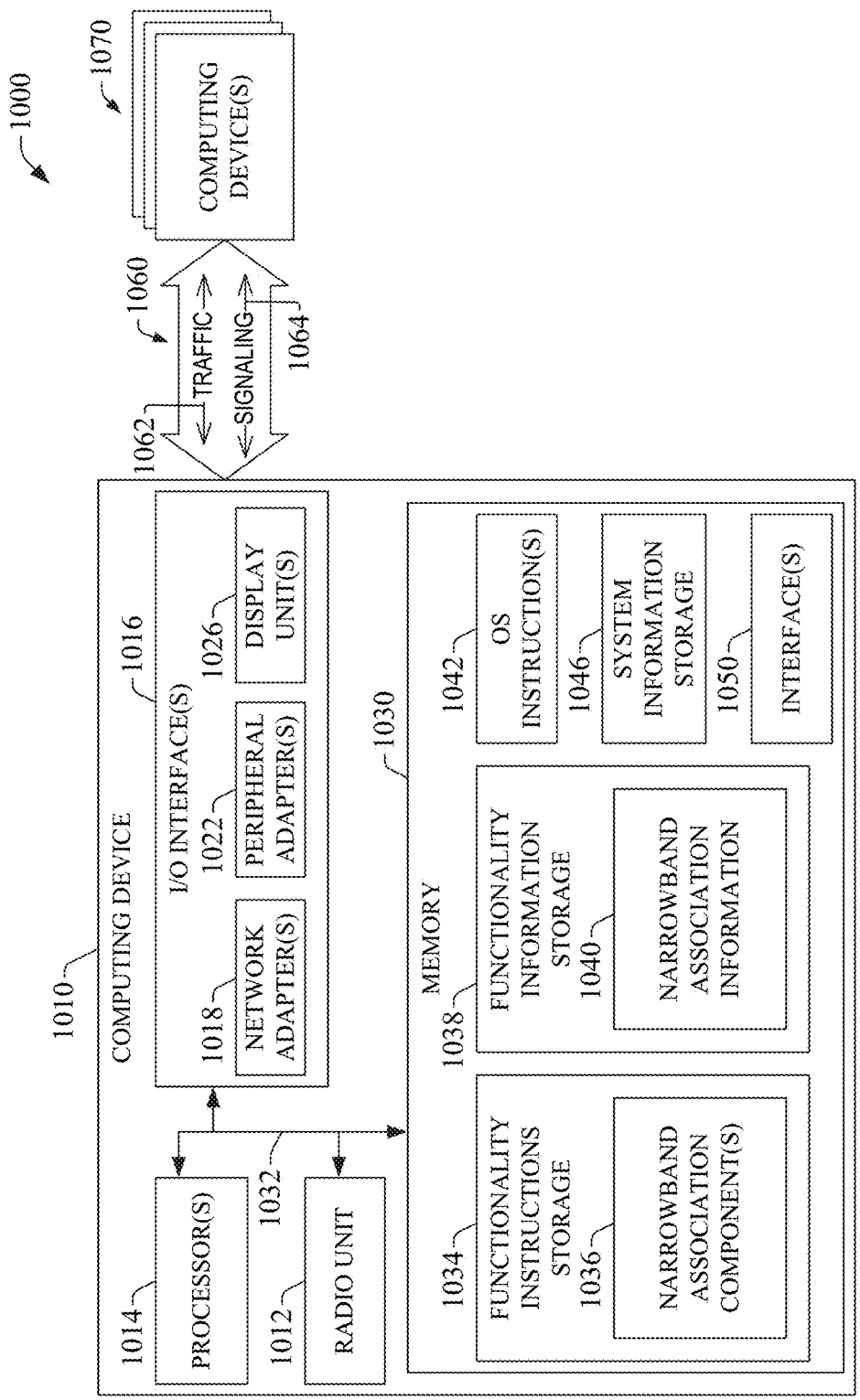
FIG. 10 presents an example of a computational environment in accordance with one or more embodiments of the disclosure.

FIG. 10 illustrates an example of a computational environment 1000 for association between communication devices in accordance with one or more aspects of the disclosure. The example computational environment 1000 is only illustrative and is not intended to suggest or otherwise convey any limitation as to the scope of use or functionality of such computational environments' architecture. In addition, the computational environment 1000 should not be interpreted as having any dependency or requirement relating to any one or combination of components illustrated in this example computational environment. The illustrative computational environment 1000 can embody or can include the communication device 130, the AP 110, and/or any other computing device that can implement or otherwise leverage the NB-RA requests and other association features described herein.

The computational environment 1000 represents an example of a software implementation of the various aspects or features of the disclosure in which the processing or execution of operations described in connection with association between communication devices and related NB-RA requests described herein, including processing of information communicated (e.g., encoded, modulated, and/or arranged) in accordance with this disclosure, can be performed in response to execution of one or more software components at the computing device 1010. It should be appreciated that the one or more software components can render the computing device 1010, or any other computing device that contains such components, a particular machine for association between communication devices in accordance with aspects described herein, including processing of information encoded, modulated, and/or arranged in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1010 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1010 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with association between communication devices, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 1010 can include one or more processors 1014, one or more input/output (I/O) interfaces 1016, a memory 1030, and a bus architecture 1032 (also termed bus 1032) that functionally couples various functional elements of the computing device 1010. As illustrated, the computing device 1010 also can include a radio unit 1012. In one example, similarly to either the radio unit 614 or the radio unit 814, the radio unit 1012 can include one or more antennas and a communication processing unit that can permit wireless communication between the computing device 1010 and another device, such as one of the computing device(s) 1070. The bus 1032 can include at least one of a system bus, a memory bus, an address bus, or a message bus, and can permit exchange of information (data, metadata, and/or signaling) between the processor(s) 1014, the I/O interface(s) 1016, and/or the memory 1030, or respective functional elements therein. In certain scenarios, the bus 1032 in conjunction with one or more internal programming interfaces 1050 (also referred to as interface(s) 1050) can permit such exchange of information. In scenarios in which processor(s) 1014 include multiple processors, the computing device 1010 can utilize parallel computing.

The I/O interface(s) 1016 can permit or otherwise facilitate communication of information between the computing device and an external device, such as another computing device, e.g., a network element or an end-user device. Such communication can include direct communication or indirect communication, such as exchange of information between the computing device 1010 and the external device via a network or elements thereof. As illustrated, the I/O interface(s) 1016 can comprise one or more of network adapter(s) 1018, peripheral adapter(s) 1022, and display unit(s) 1026. Such adapter(s) can permit or otherwise facilitate connectivity between the external device and one or more of the processor(s) 1014 or the memory 1030. In one aspect, at least one of the network adapter(s) 1018 can couple functionally the computing device 1010 to one or more computing devices 1070 via one or more traffic and signaling pipes 1060 that can permit or facilitate exchange of traffic 1062 and signaling 1064 between the computing device 1010 and the one or more computing devices 1070. Such network coupling provided at least in part by the at least one of the network adapter(s) 1018 can be implemented in a wired environment, a wireless environment, or both. Therefore, it should be appreciated that in certain embodiments, the functionality of the radio unit 1012 can be provided by a combination of at least one of the network adapter(s) and at least one of the processor(s) 1014. Accordingly, in such embodiments, the radio unit 1012 may not be included in the computing device 1010. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 1070 can have substantially the same architecture as the computing device 1010. In addition or in the alternative, the display unit(s) 1026 can include functional elements (e.g., lights, such as light-emitting diodes; a display, such as liquid crystal display (LCD), combinations thereof, or the like) that can permit control of the operation of the computing device 1010, or can permit conveying or revealing operational conditions of the computing device 1010.

In one aspect, the bus 1032 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 1032, and all buses described herein can be implemented over a wired or wireless network connection and each of the subsystems, including the processor(s) 1014, the memory 1030 and memory elements therein, and the I/O interface(s) 1016 can be contained within one or more remote computing devices 1070 at physically separate locations, connected through buses of this form, in effect implementing a fully distributed system.

The computing device 1010 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1010, and can comprise, for example, both volatile and non-volatile media, and removable and/or non-removable media. In one aspect, the memory 1030 can comprise computer-readable media in the form of volatile memory, such as random access memory (RAM), and/or non-volatile memory, such as read only memory (ROM).

The memory 1030 can comprise functionality instructions storage 1034 and functionality information storage 1038. The functionality instructions storage 1034 can comprise computer-accessible instructions that, in response to execution (by at least one of the processor(s) 1014), can implement one or more of the functionalities of the disclosure. The computer-accessible instructions can embody or can include one or more of the software components illustrated as narrowband association component(s) 1036. In one scenario, execution of at least one component of the narrowband association component(s) 1036 can implement one or more of the techniques disclosed herein. For instance, such execution can cause a processor that executes the at least one component to carry out a disclosed example method. It should be appreciated that, in one aspect, a processor of the processor(s) 1014 that executes at least one of the narrowband association component(s) 1036 can retrieve information from or retain information in a memory element 1040 in the functionality information storage 1038 in order to operate in accordance with the functionality programmed or otherwise configured by the narrowband association component(s) 1036. Such information can include at least one of code instructions, information structures, or the like. At least one of the one or more interfaces 1050 (e.g., application programming interface(s)) can permit or facilitate communication of information between two or more components within the functionality instructions storage 1034. The information that is communicated by the at least one interface can result from implementation of one or more operations in a method of the disclosure. In certain embodiments, one or more of the functionality instructions storage 1034 and the functionality information storage 1038 can be embodied in or can comprise removable/non-removable, and/or volatile/non-volatile computer storage media.

At least a portion of at least one of the narrowband association component(s) 1036 or narrowband association information 1040 can program or otherwise configure one or more of the processors 1014 to operate at least in accordance with the functionality described herein. One or more of the processor(s) 1014 can execute at least one of such components and leverage at least a portion of the information in the storage 1038 in order to provide association between communication devices in accordance with one or more aspects described herein. More specifically, yet not exclusively, execution of one or more of the component(s) 1036 can permit transmitting and/or receiving information at the computing device 1010, where the at least a portion of the information include one or more packets having preambles as described in connection with FIGS. 3-5, for example. As such, it should be appreciated that in certain embodiments, a combination of the processor(s) 1014, the narrowband association component(s) 1036, and the narrowband association information 1040 can form means for providing specific functionality for association between communication devices in accordance with one or more aspects of the disclosure.

It should be appreciated that, in certain scenarios, the functionality instruction(s) storage 1034 can embody or can comprise a computer-readable non-transitory storage medium having computer-accessible instructions that, in response to execution, cause at least one processor (e.g., one or more of processor(s) 1014) to perform a group of operations comprising the operations or blocks described in connection with the disclosed methods.

In addition, the memory 1030 can comprise computer-accessible instructions and information (e.g., data and/or metadata) that permit or facilitate operation and/or administration (e.g., upgrades, software installation, any other configuration, or the like) of the computing device 1010. Accordingly, as illustrated, the memory 1030 can comprise a memory element 1042 (labeled OS instruction(s) 1042) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architectural complexity of the computing device 1010 can dictate a suitable OS. The memory 1030 also comprises a system information storage 1046 having data and/or metadata that permits or facilitate operation and/or administration of the computing device 1010. Elements of the OS instruction(s) 1042 and the system information storage 1046 can be accessible or can be operated on by at least one of the processor(s) 1014.

It should be recognized that while the functionality instructions storage 1034 and other executable program components (such as the operating system instruction(s) 1042) are illustrated herein as discrete blocks, such software components can reside at various times in different memory components of the computing device 1010, and can be executed by at least one of the processor(s) 1014. In certain scenarios, an implementation of the narrowband association component(s) 1036 can be retained on or transmitted across some form of computer readable media.

The computing device 1010 and/or one of the computing device(s) 1070 can include a power supply (not shown), which can power up components or functional elements within such devices. The power supply can be a rechargeable power supply, e.g., a rechargeable battery, and it can include one or more transformers to achieve a power level suitable for operation of the computing device 1010 and/or one of the computing device(s) 1070, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1018) to connect operationally to the conventional power grid. In another aspect, the power supply can include an energy conversion component, such as a solar panel, to provide additional or alternative power resources or autonomy for the computing device 1010 and/or one of the computing device(s) 1070.

The computing device 1010 can operate in a networked environment by utilizing connections to one or more remote computing devices 1070. As an illustration, a remote computing device can be a personal computer, a portable computer, a server, a router, a network computer, a peer device or other common network node, and so on. As described herein, connections (physical and/or logical) between the computing device 1010 and a computing device of the one or more remote computing devices 1070 can be made via one or more traffic and signaling pipes 1060, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

It should be appreciated that portions of the computing device 1010 can embody or can constitute an apparatus. For instance, at least one of the processor(s) 1014, at least a portion of the radio unit 1012, and at least a portion of the memory 1030 can embody or can constitute an apparatus that can operate in accordance with one or more aspects of this disclosure.

Figure 11:
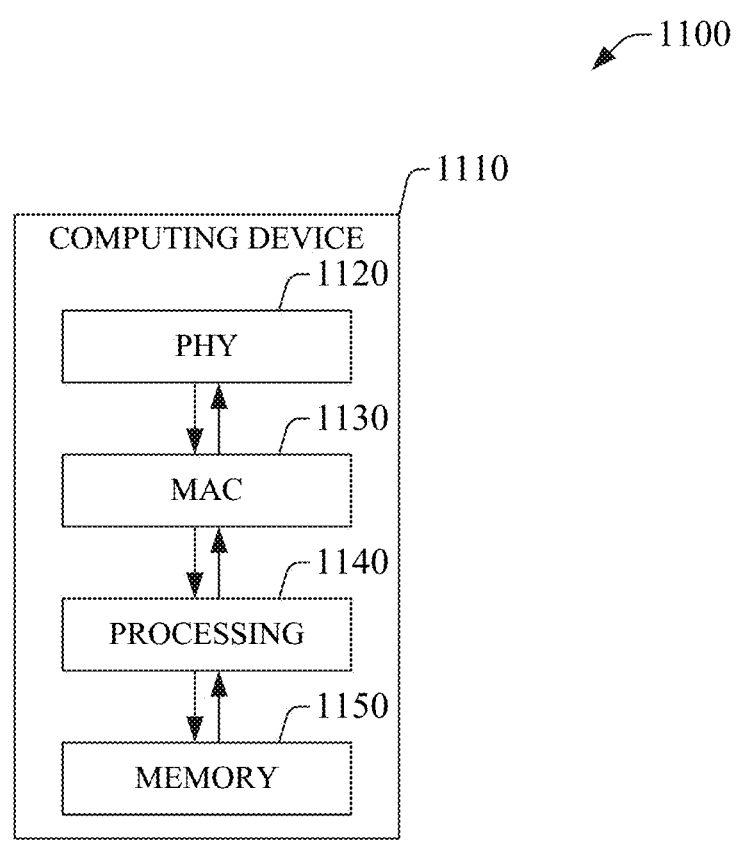
FIG. 11 presents another example of a communication device in accordance with one or more embodiments of the disclosure.

FIG. 11 presents another example embodiment 1100 of a computing device 1110 in accordance with one or more embodiments of the disclosure. In certain embodiments, the computing device 1110 can be a HEW-compliant device that may be configured to communicate with one or more other HEW devices and/or other type of communication devices, such as legacy communication devices. HEW devices and legacy devices also may be referred to as HEW stations (HEW STAs) and legacy STAs, respectively. In one implementation, the computing device 1110 can operate as an access point (such as AP 110). As illustrated, the computing device 1110 can include, among other things, physical layer (PHY) circuitry 1120 and medium-access-control layer (MAC) circuitry 1130. In one aspect, the PHY circuitry 1120 and the MAC circuitry 1130 can be HEW compliant layers and also can be compliant with one or more legacy IEEE 802.11 standards. In one aspect, the MAC circuitry 1130 can be arranged to configure physical layer converge protocol (PLCP) protocol data units (PPDUs) and arranged to transmit and receive PPDUs, among other things. In addition or in other embodiments, the computing device 1110 also can include other hardware processing circuitry 1140 (e.g., one or more processors) and one or more memory devices 1150 configured to perform the various operations described herein.

In certain embodiments, the MAC circuitry 1130 can be arranged to contend for a wireless medium during a contention period to receive control of the medium for the HEW control period and configure an HEW PPDU. In addition or in other embodiments, the PHY 1120 can be arranged to transmit the HEW PPDU. The PHY circuitry 1120 can include circuitry for modulation/demodulation, upconversion/downconversion, filtering, amplification, etc. As such, the computing device 1110 can include a transceiver to transmit and receive data such as HEW PPDU. In certain embodiments, the hardware processing circuitry 1140 can include one or more processors. The hardware processing circuitry 1140 can be configured to perform functions based on instructions being stored in a memory device (e.g., RAM or ROM) or based on special purpose circuitry. In certain embodiments, the hardware processing circuitry 1140 can be configured to perform one or more of the functions described herein, such as allocating bandwidth or receiving allocations of bandwidth.

In certain embodiments, one or more antennas (not depicted in FIG. 11) can be coupled to or included in the PHY circuitry 1120. The antenna(s) can transmit and receive wireless signals, including transmission of HEW packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1150 may store information for configuring the other circuitry to perform operations for configuring and transmitting HEW packets or other types of radio packets, and performing the various operations described herein including the allocation and/or use of bandwidth (e.g., as it may be the case in an AP) and using the allocation of the bandwidth (e.g., as it may be the case in a STA).

The computing device 1110 can be configured to communicate using OFDM communication signals over a multicarrier communication channel. More specifically, in certain embodiments, the computing device 1110 can be configured to communicate in accordance with one or more specific radio technology protocols, such as the IEEE family of standards including IEEE 802.11a, 802.11n, 802.11ac, 802.11ax, DensiFi, and/or proposed specifications for WLANs. In one of such embodiments, the computing device 1110 can utilize or otherwise rely on symbols having a duration that is four times the symbol duration of 802.11n and/or 802.11 ac. It should be appreciated that the disclosure is not limited in this respect and, in certain embodiments, the computing device 1110 also can transmit and/or receive wireless communications in accordance with other protocols and/or standards.

The computing device 1110 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other type of communication device that may receive and/or transmit information wirelessly. Similarly to the computing device 810, the computing device 1110 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 1110 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors. It should further be appreciated that portions of the computing device 1110 can embody or can constitute an apparatus. For instance, the processing circuitry 1140 and the memory 1150 can embody or can constitute an apparatus that can operate in accordance with one or more aspects of this disclosure.

In view of the aspects described herein, various techniques for association requests between communication devices can be implemented in accordance with the disclosure. Examples of such techniques can be better appreciated with reference, for example, to the flowcharts in FIGS. 12-13. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 12:
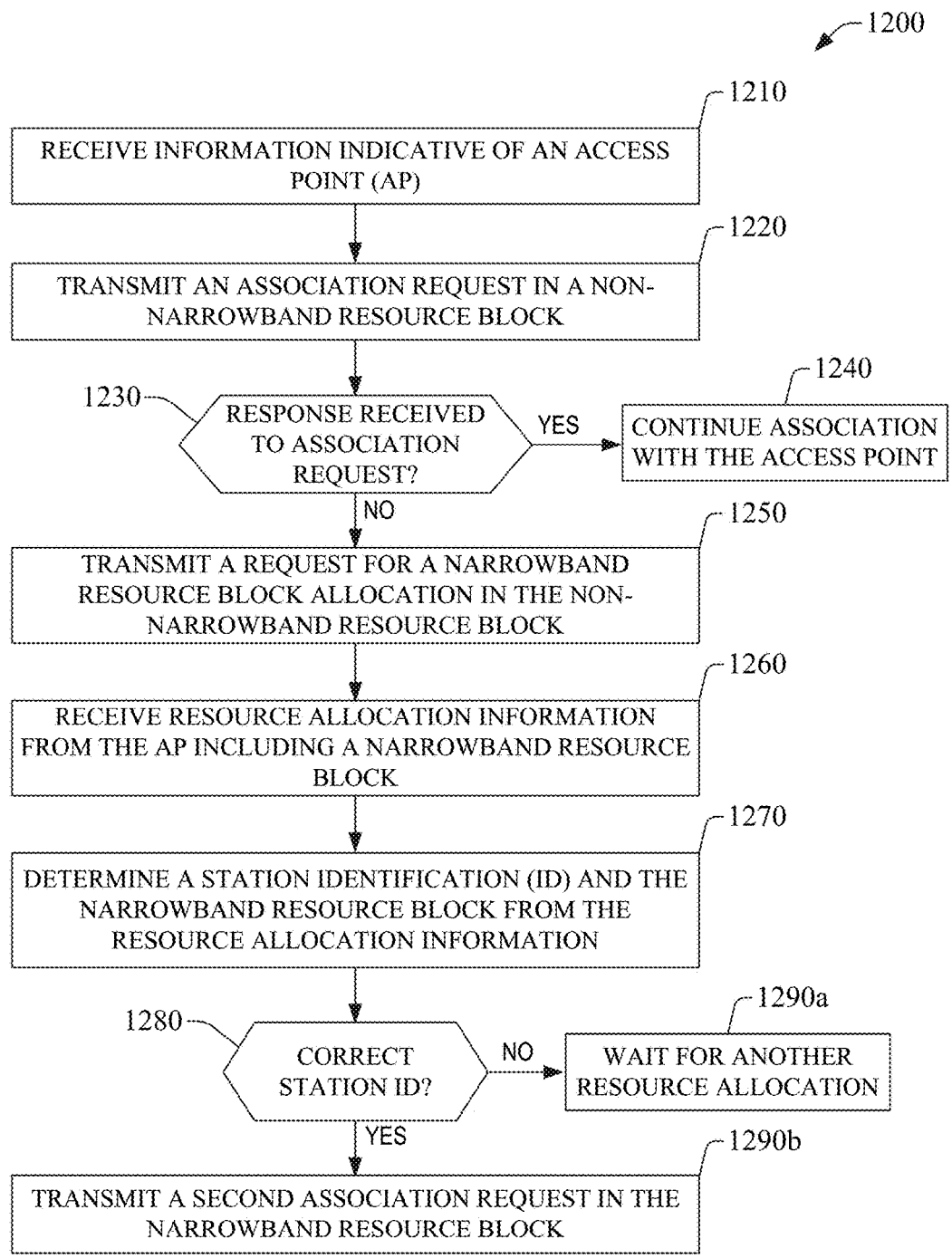
FIGS. 12-13 present example methods in accordance with one or more embodiments of the disclosure.
Figure 13:
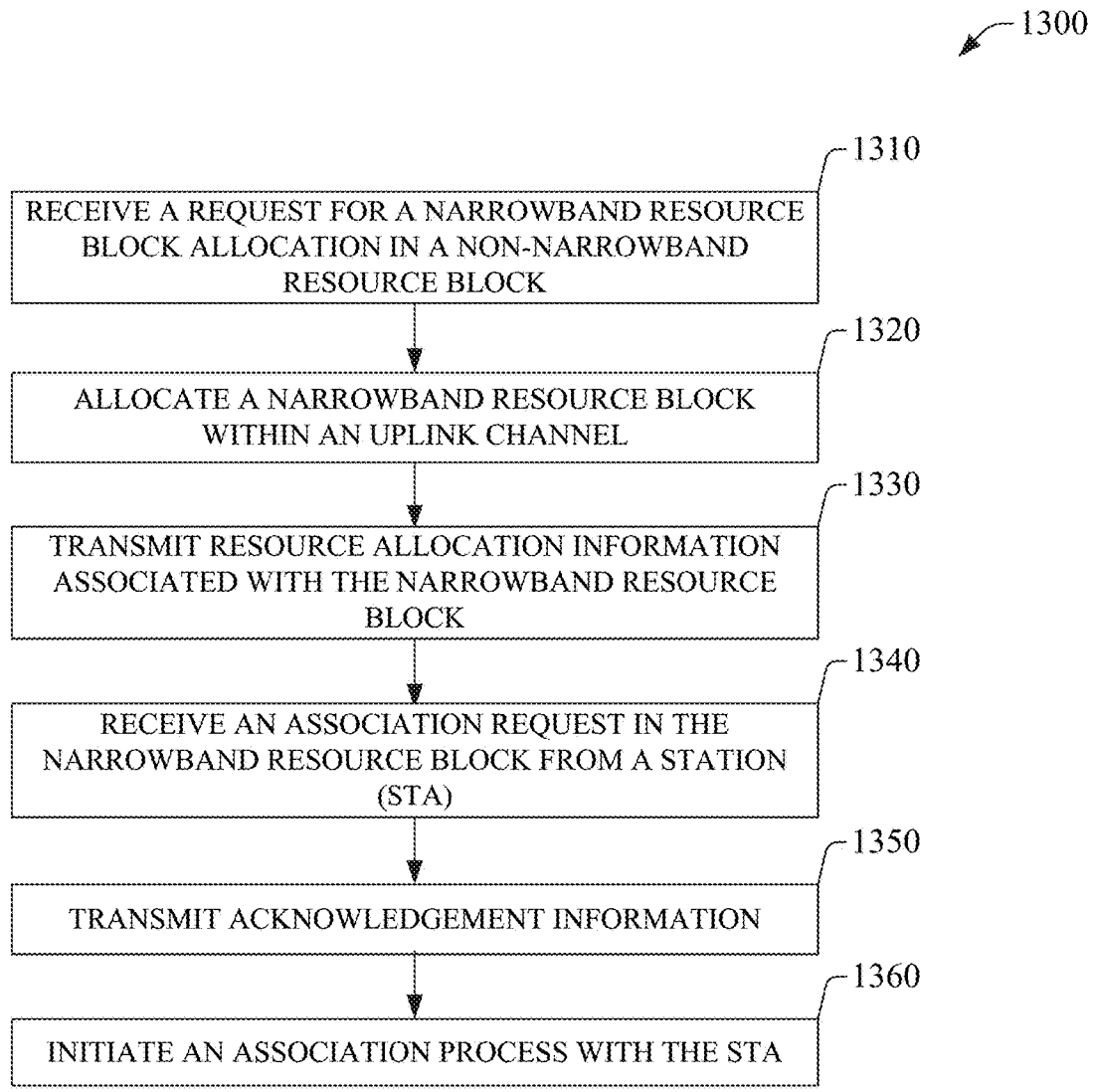

FIGS. 12-13 present example methods 1200 and 1300 for association between a station or other type of user equipment and an access point in accordance with one or more embodiments of the disclosure. The station can implement at least some of the blocks of the example method 1300. At block 1210, information indicative of an access point (AP) can be received at the STA. At block 1220, an association request can be transmitted by the STA in a non-narrowband resource block. For example, the STA can transmit the association request in the sub-carriers of a channel (except for nulls at edges, guards, and direct current (DC)). At block 1230, the STA can determine if a response (e.g., an ACK frame) to the association request is received. In case the response is received, association between the STA and the AP can continue at block 1240. In the alternative, in response to ascertaining that a response is not received at the STA, the STA can transmit at block 1250 a request for a narrowband resource block allocation in the non-narrowband resource block (e.g., a 20 MHz channel). In certain embodiments, such a request can be conveyed in the NB-RA request frame described herein. At block 1260, the STA can receive resource allocation information from the AP. At least a portion of the resource allocation information can include information indicative of a narrowband resource block (e.g., a 2.5 MHz sub-channel or specific group of sub-carriers). At block 1270, the STA can determine a station identification (e.g., a STA-ID code or other type of code) and a resource allocation from the resource allocation information. At block 1280, the STA can determine if the user-equipment identification identifies the STA. In response to a negative determination (the illustrated "No" branch), the STA can wait for another resource allocation at block 1290*a*. In addition or in other embodiments, the STA can implement other operations in response to a negative determination at block 1280. For instance, the STA can retransmit a request for a narrowband resource block allocation or can implement some other type of exception handling. In the alternative, in response to an affirmative determination (the illustrated "Yes" branch), the STA can transmit, at block 1290*b*, a second association request in the allocated narrowband resource block.

It can be appreciated that the example method 1200 can represent the operational behavior of a station or other type of user equipment that attempts to associate with an access point in the presence of a link-budget imbalance as described herein. Example method 1300 can represent the behavior of the access point in response to the station or the other equipment attempting to associate with the access point. At block 1310, the AP can receive a request for a narrowband resource block allocation in a non-narrowband resource block (e.g., a 20 MHz). Such a request can be received at the AP in response to the AP transmitting a beacon or other type of pilot signal conveying the presence of the AP in the wireless environment. At block 1320, the AP can allocate a narrowband resource block (e.g., a 2.5 MHz sub-channel) for the STA to provide wireless transmissions in the UL. At block 1330, the AP can send or otherwise transmit resource allocation information associated with the narrowband resource block. At block 1340, the AP can receive an association request in the narrowband resource block from the STA. At block 1350, the AP can transmit acknowledgement information (e.g., an ACK frame). At block 1360, the AP can initiate an association process with the STA.

Additional or alternative embodiments of the disclosure emerge from the foregoing description and the annexed drawings. In certain embodiments, the disclosure provides an apparatus for wireless telecommunication. The apparatus can include comprising at least one memory device having programmed instructions; and at least one processor functionally coupled to the at least one memory device and configured to execute the programmed instructions, and in response to execution of the programmed instructions. The at least one processor can be further configured to determine that a response to an association request is not received at the apparatus; generate a request for a narrowband resource block allocation in a channel having a predetermined spectral width; send a request for a narrowband resource block allocation in the channel; receive resource allocation information indicative of an identification code and a narrowband resource block within the channel; determine that the identification code corresponds to the apparatus; and send a second association request in the narrowband resource block. It should be appreciated that in certain embodiments, the response to the association request may be received from an access point, which may have been the destination device for the association request. In one aspect, such an association request may be received from an access point. In addition, the request for the narrowband resource block allocation may be sent or otherwise transmitted to the access point, which may provide the resource allocation information that is received at the apparatus. Further, in one aspect, the second association request in the narrowband resource block can be sent or otherwise transmitted to the access point.

In addition or in other embodiments, the at least one processor of the apparatus can be further configured to generate a frame associated with the request for a narrowband resource block, the frame comprising a legacy preamble and a payload field modulated according to one of on-off keying (OOK), amplitude shift keying (ASK), frequency shift keying (FSK), or repetition coding. To that end, in one embodiment, the at least one processor of the apparatus can be further configured to modulate the frame using on-off keying, the payload field comprising a preamble, a MAC header, a content field, and a validation field. The MAC header can convey that the frame corresponds to the request for the narrowband resource block, the content field conveys the identification code, and the validation field corresponds to a frame check sequence of the MAC header and the content field.

In addition or in other embodiments, the at least one processor of the apparatus can be further configured to generate a frame associated with the request for a narrowband resource block, the frame comprising a legacy preamble, a non-legacy preamble, and a payload field. To that end, in one embodiment, the at least one processor of the apparatus can be further configured to encode the frame using an eight-time coding scheme, the payload field comprising a MAC header, a content field, and a validation field. The MAC header conveys that the frame corresponds to the request for the narrowband resource block, the content field conveys the identification code, and the validation field corresponds to a frame checksum of the MAC header and the content field.

In addition or in other embodiments, the access point operates according to a protocol of IEEE 802.11ax standard, the predetermined spectral width of the channel is about 20 MHz, and the narrowband resource block spans 2.5 MHz.

In certain embodiments, the disclosure provides a method for wireless communication. The method can include generating, by a communication device having at least one processor and at least one memory device, an association request in a resource block spanning a spectral width of a channel; sending, by the communication device, the association request to a remote communication device; determining that a response to the association request is not received at the computing device from the remote communication device; generating, by the communication device, a request for a narrowband resource block allocation within the channel; sending, by the communication device, a request for a narrowband resource block allocation within the channel to the remote communication device; receiving, by the communication device, from the remote communication device, resource allocation information indicative of an identification code and a narrowband resource block within the channel; determining, by the communication device, that the identification code corresponds to the communication device; and sending a second association request in the narrowband resource block to the remote communication device.

In addition or in other embodiments, generating the request for the narrowband resource block allocation comprises generating, by the communication device, a frame including a legacy preamble and a payload field modulated according to one of on-off keying (OOK), amplitude shift keying (ASK), frequency shift keying (FSK), or repetition coding. In certain implementations, generating the frame comprises modulating the frame using on-off keying, the payload field including a preamble, a MAC header, a content field, and a validation field. The MAC header can convey that the frame corresponds to the request for the narrowband resource block, the content field conveys the identification code, and the validation field corresponds to a frame checksum of the MAC header and the content field.

In addition or in other embodiments, generating the request for the narrowband resource block allocation comprises generating, by the communication device, a frame comprising a legacy preamble, a non-legacy preamble, and a payload field. In one implementation, generating the frame comprises encoding the frame using an eight-time coding scheme, the payload field comprising a MAC header, a content field, and a validation field. The MAC header conveys that the frame corresponds to the request for the narrowband resource block, the content field conveys the identification code, and the validation field corresponds to a frame checksum of the MAC header and the content field.

In certain embodiments, the disclosure provides at least one computer-readable non-transitory storage medium having instructions encoded thereon that, in response to execution, cause a device (e.g., a communication device) to perform operations including: generating an association request in a resource block spanning a spectral width of a channel; sending the association request to a remote communication device; determining that a response to the association request is not received at the computing device from the remote communication device; generating a request for a narrowband resource block allocation within the channel; sending a request for a narrowband resource block allocation within the channel to the remote communication device; receiving from the remote communication device, resource allocation information indicative of an identification code and a narrowband resource block within the channel; determining that the identification code corresponds to the communication device; and sending a second association request in the narrowband resource block to the remote communication device.

In addition or in other embodiments, in the at least one computer-readable non-transitory storage medium, generating the request for the narrowband resource block allocation can include generating a frame including a legacy preamble and a payload field modulated according to one of on-off keying (OOK), amplitude shift keying (ASK), frequency shift keying (FSK), or repetition coding. In certain implementations, generating the frame comprises modulating the frame using on-off keying, the payload field including a preamble, a MAC header, a content field, and a validation field. The MAC header can convey that the frame corresponds to the request for the narrowband resource block, the content field can convey the identification code, and the validation field can correspond to a frame checksum of the MAC header and the content field.

In addition or in other embodiments, in the at least one computer-readable non-transitory storage medium, generating the request for the narrowband resource block allocation can include generating a frame comprising a legacy preamble, a non-legacy preamble, and a payload field. In one implementation, generating the frame can include encoding the frame using an eight-time coding scheme, the payload field comprising a MAC header, a content field, and a validation field. The MAC header can convey that the frame corresponds to the request for the narrowband resource block, the content field can convey the identification code, and the validation field can correspond to a frame checksum of the MAC header and the content field.

In certain embodiments, the disclosure provides An apparatus for wireless communication, including: means for generating an association request in a resource block spanning a spectral width of a channel; means for sending the association request to a remote communication device; means for determining that a response to the association request is not received at the computing device from the remote communication device; means for generating a request for a narrowband resource block allocation within the channel; means for sending a request for a narrowband resource block allocation within the channel to the remote communication device; means for receiving from the remote communication device, resource allocation information indicative of an identification code and a narrowband resource block within the channel; means for determining that the identification code corresponds to the communication device; and means for sending a second association request in the narrowband resource block to the remote communication device.

In addition or in other embodiments of the apparatus, the means for generating the request for the narrowband resource block allocation can include means for generating a frame including a legacy preamble and a payload field modulated according to one of on-off keying (OOK), amplitude shift keying (ASK), frequency shift keying (FSK), or repetition coding. In certain implementations, the means for generating the frame can include modulating the frame using on-off keying, the payload field including a preamble, a MAC header, a content field, and a validation field. The MAC header conveys that the frame corresponds to the request for the narrowband resource block, the content field conveys the identification code, and the validation field corresponds to a frame checksum of the MAC header and the content field.

In addition or in other embodiments of the apparatus, the means for generating the request for the narrowband resource block allocation can include means for generating a frame comprising a legacy preamble, a non-legacy preamble, and a payload field. In certain implementations, the means for generating the frame can include means for encoding the frame using an eight-time coding scheme, the payload field comprising a MAC header, a content field, and a validation field. The MAC header can convey that the frame corresponds to the request for the narrowband resource block, the content field can convey the identification code, and the validation field can correspond to a frame checksum of the MAC header and the content field.

In certain embodiments, the disclosure can provide an apparatus for wireless telecommunication. The apparatus can include: at least one radio unit; at least one memory device having programmed instructions; and at least one processor functionally coupled to the at least one memory device and configured to execute the programmed instructions. In response to execution of the programmed instructions, the at least one processor can be further configured to receive a request for a narrowband resource block allocation in a channel having a predetermined spectral width; to allocate the narrowband resource block within an uplink channel within the channel; to transmit, to a station, resource allocation information associated with the narrowband resource block; and to receive an association request in the narrowband resource block from the station.

In addition or in other embodiments, the at least one processor of the apparatus can be further configured to initiate an association process with the station.

In addition or in other embodiments, the at least one processor of the apparatus can be further configured to receive a frame associated with the request for a narrowband resource block, the frame comprising a legacy preamble and a payload field modulated according to one of on-off keying (OOK), amplitude shift keying (ASK), frequency shift keying (FSK), or repetition coding. In certain implementations, the at least one processor can be further configured to demodulate the frame using on-off keying, the payload field comprising a preamble, a MAC header, a content field, and a validation field. The MAC header can convey that the frame corresponds to the request for the narrowband resource block, the content field can convey the identification code, and the validation field can correspond to a frame check sequence of the MAC header and the content field.

In addition or in other embodiments, the at least one processor of the apparatus can be further configured to receive a frame associated with the request for a narrowband resource block, the frame comprising a legacy preamble, a non-legacy preamble, and a payload field. In certain implementations, the at least one processor can be further configured to decode the frame using an eight-time coding scheme, the payload field including a MAC header, a content field, and a validation field. The MAC header can convey that the frame corresponds to the request for the narrowband resource block, the content field can convey the identification code, and the validation field can correspond to a frame checksum of the MAC header and the content field.

In addition or in other embodiments of the apparatus, the station can operate according to a protocol of IEEE 802.11ax standard, and the predetermined spectral width can be about 20 MHz, and the narrowband resource block can span 2.5 MHz.

In certain embodiments, the disclosure can provide a method for wireless telecommunication. The method can include: receiving, by a communication device having at least one processor and at least one memory device, a request for a narrowband resource block allocation in a channel having a predetermined spectral width; allocating, by the communication device, the narrowband resource block within an uplink channel within the channel; sending, by the communication device, resource allocation information associated with the narrowband resource block to a remote communication device; and receiving, by the communication device, an association request in the narrowband resource block from the remote communication device.

In addition or in other embodiments of the method, the method also can include initiating, by the communication device, an association process with the station.

In addition or in other embodiments of the method, receiving the request for the narrowband resource block allocation can include receiving, by the communication device, a frame associated with the request, the frame comprising a legacy preamble and a payload field modulated according to one of on-off keying (OOK), amplitude shift keying (ASK), frequency shift keying (FSK), or repetition coding. In certain implementations, receiving the frame associated with the request comprises demodulating the frame using on-off keying, the payload field comprising a preamble, a MAC header, a content field, and a validation field. The MAC header can convey that the frame corresponds to the request for the narrowband resource block, the content field can convey the identification code, and the validation field can correspond to a frame check sequence of the MAC header and the content field.

In addition or in other embodiments of the method, receiving the request for the narrowband resource block allocation can include receiving, by the communication device, a frame associated with the request, the frame comprising a legacy preamble, a non-legacy preamble, and a payload field. In certain implementations, receiving the frame associated with the request comprises decoding the frame using an eight-time coding scheme, the payload field can include a MAC header, a content field, and a validation field. The MAC header can convey that the frame corresponds to the request for the narrowband resource block, the content field can convey the identification code, and the validation field can correspond to a frame checksum of the MAC header and the content field.

In certain embodiments, the disclosure can provide at least one computer-readable non-transitory storage medium having instructions encoded thereon that, in response to execution, cause a device to perform operations including: receiving a request for a narrowband resource block allocation in a channel having a predetermined spectral width; allocating the narrowband resource block within an uplink channel within the channel; sending resource allocation information associated with the narrowband resource block to a remote communication device; and receiving an association request in the narrowband resource block from the remote communication device.

In addition or in other embodiments of the at least one computer-readable non-transitory storage medium, the operations can further include initiating an association process with the station.

In addition or in other embodiments of the at least one computer-readable non-transitory storage medium, receiving the request for the narrowband resource block allocation can include receiving a frame associated with the request, the frame comprising a legacy preamble and a payload field modulated according to one of on-off keying (OOK), amplitude shift keying (ASK), frequency shift keying (FSK), or repetition coding.

In addition or in other embodiments of the at least one computer-readable non-transitory storage medium, receiving the frame associated with the request can include demodulating the frame using on-off keying, the payload field comprising a preamble, a MAC header, a content field, and a validation field. The MAC header can convey that the frame corresponds to the request for the narrowband resource block, the content field can convey the identification code, and the validation field can correspond to a frame check sequence of the MAC header and the content field.

In addition or in other embodiments of the at least one computer-readable non-transitory storage medium, receiving the request for the narrowband resource block allocation comprises receiving a frame associated with the request, the frame comprising a legacy preamble, a non-legacy preamble, and a payload field. In certain implementations, receiving the frame associated with the request comprises decoding the frame using an eight-time coding scheme, the payload field comprising a MAC header, a content field, and a validation field. The MAC header conveys that the frame corresponds to the request for the narrowband resource block, the content field conveys the identification code, and the validation field corresponds to a frame checksum of the MAC header and the content field.

In certain embodiments, the disclosure provides an apparatus. The apparatus can include means for receiving a request for a narrowband resource block allocation in a channel having a predetermined spectral width; means for allocating the narrowband resource block within an uplink channel within the channel; means for sending resource allocation information associated with the narrowband resource block to a remote communication device; and means for receiving an association request in the narrowband resource block from the remote communication device.

In addition or in other embodiments of the apparatus, the apparatus can further include means for initiating an association process with the station.

In addition or in other embodiments of the apparatus, the means for receiving the request for the narrowband resource block allocation can include means for receiving a frame associated with the request, the frame comprising a legacy preamble and a payload field modulated according to one of on-off keying (OOK), amplitude shift keying (ASK), frequency shift keying (FSK), or repetition coding. In certain implementations, the means for receiving the frame associated with the request comprises means for demodulating the frame using on-off keying, the payload field comprising a preamble, a MAC header, a content field, and a validation field. The MAC header can convey that the frame corresponds to the request for the narrowband resource block, the content field can convey the identification code, and the validation field can correspond to a frame check sequence of the MAC header and the content field.

In addition or in other embodiments of the apparatus, the means for receiving the request for the narrowband resource block allocation can include means for receiving a frame associated with the request, the frame comprising a legacy preamble, a non-legacy preamble, and a payload field. In certain implementations, the means for receiving the frame associated with the request can include means for decoding the frame using an eight-time coding scheme, the payload field comprising a MAC header, a content field, and a validation field. The MAC header conveys that the frame corresponds to the request for the narrowband resource block, the content field conveys the identification code, and the validation field corresponds to a frame checksum of the MAC header and the content field.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that can permit association between communication devices (e.g., a station and an access point) in the presence of a link-budget imbalance between such devices. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. An apparatus for wireless telecommunication, comprising:
   at least one memory device having programmed instructions; and
   at least one processor functionally coupled to the at least one memory device and configured to execute the programmed instructions, and in response to execution of the programmed instructions, further configured to:

send, to a second apparatus in a first channel, an association request;
determine that a response to the association request is not received at the apparatus;
generate, based on the determination, a request to the second apparatus for a narrowband resource block allocation in a second channel having a predetermined spectral width, wherein the predetermined spectral width is smaller than an operating channel width of the first channel;
send the request for the narrowband resource block allocation;
receive resource allocation information indicative of (a) a station identification code and (b) the narrowband resource block allocation;
determine that the station identification code corresponds to the apparatus; and
send a second association request to the second apparatus in the narrowband resource block.

2. The apparatus of claim 1, wherein the at least one processor is further configured to generate a frame associated with the request for the narrowband resource block allocation, the frame comprising a legacy preamble and a payload field modulated according to one of on-off keying (OOK), amplitude shift keying (ASK), frequency shift keying (FSK), or repetition coding.

3. The apparatus of claim 2, wherein the at least one processor is further configured to modulate the frame using on-off keying, the payload field comprising a preamble, a medium access control (MAC) header, a content field, and a validation field,
wherein the MAC header conveys that the frame corresponds to the request for the narrowband resource block allocation, the content field conveys the station identification code, and the validation field corresponds to a frame check sequence of the MAC header and the content field.

4. The apparatus of claim 1, wherein the at least one processor is further configured to generate a frame associated with the request for the narrowband resource block allocation, the frame comprising a legacy preamble, a non-legacy preamble, and a payload field.

5. The apparatus of claim 4, wherein the at least one processor is further configured to encode the frame using an eight-time coding scheme, the payload field comprising a medium access control (MAC) header, a content field, and a validation field,
wherein the MAC header conveys that the frame corresponds to the request for the narrowband resource block allocation, the content field conveys the station identification code, and the validation field corresponds to a frame checksum of the MAC header and the content field.

6. The apparatus of claim 1, wherein the second apparatus is an access point, the second association request is sent to the access point operating according to a protocol of IEEE 802.11ax standard, the operating channel width of the first channel is about 20 MHz, and the predetermined spectral width is 2.5 MHz.

7. A method for wireless communication, comprising:
generating, by a communication device having at least one processor and at least one memory device, an association request in a resource block spanning a first spectral width of a first channel;
sending, by the communication device, the association request to a remote communication device;
determining that a response to the association request is not received at the communication device from the remote communication device;
generating, by the communication device, based on the determination, a request to the remote communication device for a narrowband resource block allocation in a second channel having a second spectral width, wherein the second spectral width is smaller than the first spectral width of the first channel;
sending, by the communication device, the request for the narrowband resource block allocation;
receiving, by the communication device, from the remote communication device, resource allocation information indicative of a station identification code and the narrowband resource block allocation;
determining, by the communication device, that the station identification code corresponds to the communication device; and
sending a second association request in the narrowband resource block to the remote communication device.

8. The method of claim 7, wherein generating the request for the narrowband resource block allocation comprises generating, by the communication device, a frame including a legacy preamble and a payload field modulated according to one of on-off keying (OOK), amplitude shift keying (ASK), frequency shift keying (FSK), or repetition coding.

9. The method of claim 8, wherein generating the frame comprises modulating the frame using on-off keying, the payload field including a preamble, a medium access control (MAC) header, a content field, and a validation field,
wherein the MAC header conveys that the frame corresponds to the request for the narrowband resource block allocation, the content field conveys the station identification code, and the validation field corresponds to a frame checksum of the MAC header and the content field.

10. The method of claim 7, wherein generating the request for the narrowband resource block allocation comprises generating, by the communication device, a frame comprising a legacy preamble, a non-legacy preamble, and a payload field.

11. The method of claim 10, wherein generating the frame comprises encoding the frame using an eight-time coding scheme, the payload field comprising a medium access control (MAC) header, a content field, and a validation field,
wherein the MAC header conveys that the frame corresponds to the request for the narrowband resource block allocation, the content field conveys the station identification code, and the validation field corresponds to a frame checksum of the MAC header and the content field.

12. At least one computer-readable non-transitory storage medium having instructions encoded thereon that, in response to execution, cause a communication device to perform operations comprising:
generating an association request in a resource block spanning a first spectral width of a first channel;
sending the association request to a remote communication device;
determining that a response to the association request is not received at the communication device from the remote communication device;
generating, based on the determination, a request to the remote communication device for a narrowband resource block allocation in a second channel having a second spectral width, wherein the second spectral width is smaller than the first spectral width of the first channel;

sending the request for the narrowband resource block allocation;

receiving from the remote communication device, resource allocation information indicative of (a) a station identification code and (b) the narrowband resource block allocation;

determining that the station identification code corresponds to the communication device; and sending a second association request in the narrowband resource block to the remote communication device.

13. The at least one computer-readable non-transitory storage medium of claim 12, wherein generating the request for the narrowband resource block allocation comprises generating a frame including a legacy preamble and a payload field modulated according to one of on-off keying (OOK), amplitude shift keying (ASK), frequency shift keying (FSK), or repetition coding.

14. The at least one computer-readable non-transitory storage medium of claim 13, wherein generating the frame comprises modulating the frame using on-off keying, the payload field including a preamble, a medium access control (MAC) header, a content field, and a validation field, wherein the MAC header conveys that the frame corresponds to the request for the narrowband resource block allocation, the content field conveys the station identification code, and the validation field corresponds to a frame checksum of the MAC header and the content field.

15. The at least one computer-readable non-transitory storage medium of claim 12, wherein generating the request for the narrowband resource block allocation comprises generating a frame comprising a legacy preamble, a non-legacy preamble, and a payload field.

16. The at least one computer-readable non-transitory storage medium of claim 15, wherein generating the frame comprises encoding the frame using an eight-time coding scheme, the payload field comprising a medium access control (MAC) header, a content field, and a validation field, wherein the MAC header conveys that the frame corresponds to the request for the narrowband resource block allocation, the content field conveys the station identification code, and the validation field corresponds to a frame checksum of the MAC header and the content field.

17. An apparatus for wireless telecommunication, comprising:

at least one radio unit;

at least one memory device having programmed instructions; and at least one processor functionally coupled to the at least one memory device and configured to execute the programmed instructions, and in response to execution of the programmed instructions, further configured to:

receive, from a station device, a request for a narrowband resource block allocation in a first channel having a predetermined spectral width;

allocate the narrowband resource block within an uplink channel within the first channel, wherein the uplink channel has a spectral width that is smaller than the predetermined spectral width;

send, to the station device, resource allocation information associated with the narrowband resource block, the resource allocation information comprising a station identification code indicative of the station device; and receive an association request in the narrowband resource block from the station device.

18. The apparatus of claim 17, wherein the at least one processor is further configured to initiate an association process with the station device.

19. The apparatus of claim 17, wherein the at least one processor is further configured to receive a frame associated with the request for the narrowband resource block allocation, the frame comprising a legacy preamble and a payload field modulated according to one of on-off keying (OOK), amplitude shift keying (ASK), frequency shift keying (FSK), or repetition coding.

20. The apparatus of claim 19, wherein the at least one processor is further configured to demodulate the frame using on-off keying, the payload field comprising a preamble, a medium access control (MAC) header, a content field, and a validation field, wherein the MAC header conveys that the frame corresponds to the request for the narrowband resource block allocation, the content field conveys the station identification code, and the validation field corresponds to a frame check sequence of the MAC header and the content field.

21. The apparatus of claim 17, wherein the at least one processor is further configured to receive a frame associated with the request for the narrowband resource block allocation, the frame comprising a legacy preamble, a non-legacy preamble, and a payload field.

22. The apparatus of claim 21, wherein the at least one processor is further configured to decode the frame using an eight-time coding scheme, the payload field comprising a medium access control (MAC) header, a content field, and a validation field, wherein the MAC header conveys that the frame corresponds to the request for the narrowband resource block allocation, the content field conveys the station identification code, and the validation field corresponds to a frame checksum of the MAC header and the content field.

23. The apparatus of claim 17, wherein the station device operates according to a protocol of IEEE 802.11ax standard, and wherein the predetermined spectral width is about 20 MHz, and the spectral width of the uplink channel spans 2.5 MHz.

* * * * *